United States Patent [19]

Takimoto et al.

[11] Patent Number: 5,384,649
[45] Date of Patent: Jan. 24, 1995

[54] LIQUID CRYSTAL SPATIAL LIGHT MODULATOR WITH ELECTRICALLY ISOLATED REFLECTING FILMS CONNECTED TO ELECTRICALLY ISOLATED PIXEL PORTIONS OF PHOTO CONDUCTOR

[75] Inventors: Akio Takimoto, Neyagawa; Yukio Tanaka, Kadoma; Junko Asayama, Suita; Koji Akiyama, Neyagawa; Yasunori Kuratomi, Suita; Hisahito Ogawa, Nara, all of Japan

[73] Assignee: Matsushita Electric Industrial Co., Ltd., Japan

[21] Appl. No.: 994,127

[22] Filed: Dec. 21, 1992

[30] Foreign Application Priority Data

Dec. 26, 1991 [JP] Japan .................. 3-344521
May 19, 1992 [JP] Japan .................. 4-125846
May 28, 1992 [JP] Japan .................. 4-136580
May 28, 1992 [JP] Japan .................. 4-136581

[51] Int. Cl.[6] .............. G02F 1/1335; G02F 1/135
[52] U.S. Cl. ........................ 359/67; 359/72; 359/71
[58] Field of Search .................. 359/72, 67, 71

[56] References Cited

U.S. PATENT DOCUMENTS

| | | | |
|---|---|---|---|
| 4,538,884 | 9/1985 | Masaki | 359/72 |
| 4,619,501 | 10/1986 | Armitage | 359/72 |
| 4,693,561 | 9/1987 | Ashley et al. | 359/72 |
| 4,799,773 | 1/1989 | Sterling | 359/71 |
| 4,913,531 | 4/1990 | Efron et al. | 359/72 |
| 4,941,735 | 7/1990 | Moddel et al. | 359/72 |
| 5,073,010 | 12/1991 | Johnson et al. | 359/72 |
| 5,076,670 | 12/1991 | Sayyah | 359/72 |
| 5,168,378 | 12/1992 | Black et al. | 359/72 |
| 5,178,445 | 1/1993 | Moddel et al. | 359/72 |
| 5,220,445 | 6/1993 | Takenaka et al. | 359/72 |

FOREIGN PATENT DOCUMENTS

| | | |
|---|---|---|
| 0265903 | 5/1988 | European Pat. Off. . |
| 1955915 | 6/1970 | Germany . |
| 62-040430 | 2/1987 | Japan . |
| 62-169120 | 7/1987 | Japan . |
| 62-242919 | 10/1987 | Japan . |
| 3192332 | 8/1991 | Japan . |

OTHER PUBLICATIONS

J. D. Marcgerum et al, Appl. Phys. Lett. 17(2), Jul. 15, 1970, pp. 51–53, "Reversible Ultraviolet Imaging with Liquid Crystals".
T. J. Beard et al., Appl. Phys. Lett. 22(3), Feb. 1, 1973, pp. 90–92 "AC Liquid Crystal Light Value".
U. Efron et al, J. Appl. Phys. 57(4), pp. 1356–1368, Feb. 15, 1985 "The Silicon Liquid–Crystal Light Value".
R. D. Sterling et al, SID 90 Digest, 17A.2: pp. 327–329, 1990. "Video–Rate Liquid–Crystal Light–Value Using an Amorphous Silicon Photoconductor".
S. Takahashi et al, Appl. Phys. Lett. 51(16), Oct. 19, 1987, pp. 1233–1235. "High-speed Light Value Using an Amorphous Silicon Photosensor . . . ".
G. Moddel et al, Appl. Phys. Lett. 55(6), Aug. 7, 1989, pp. 537–539. "High-Speed Binary Optically Addressed Spatial Light Modulator".
M. Bone et al, SID 91 Digest, 13.3 1991, pp. 254–256, "Video-Rate Photo-Addressed Ferroelectric LC Light Value with Grey Scale".

*Primary Examiner*—Anita Pellman Gross
*Attorney, Agent, or Firm*—Renner, Otto, Boisselle & Sklar

[57] ABSTRACT

Pixel portions of a photoconductive layer each have a pin structure for providing a rectifying function and are substantially electrically isolated from one another by a highly resistant inter-pixel portion for preventing diffusion of electrical carriers. Data written into a liquid crystal layer by writing light is read out as an optical output by reading light. Reflecting films are provided on the pixel portions, respectively, and an output light blocking film is provided on the inter-pixel portion formed into a groove. The reflecting films and the output light blocking film are partially overlapped on each other so as to sufficiently block the reading light.

27 Claims, 11 Drawing Sheets

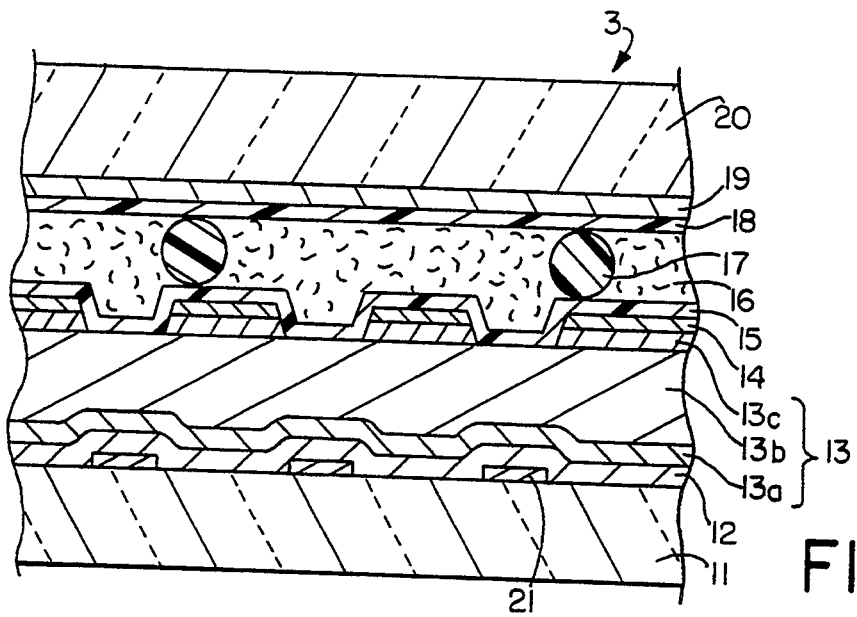
FIG. 4
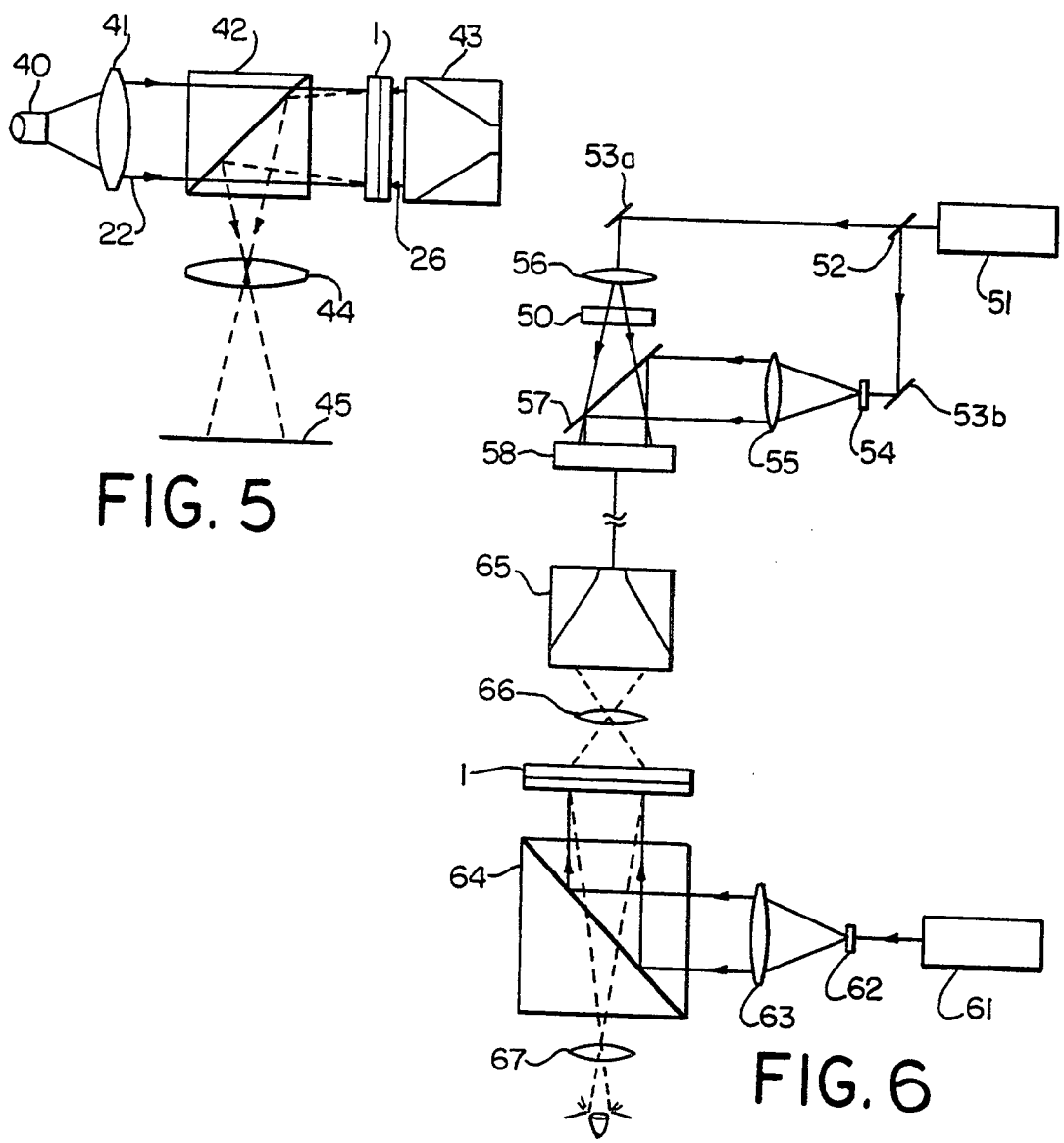
FIG. 5
FIG. 6

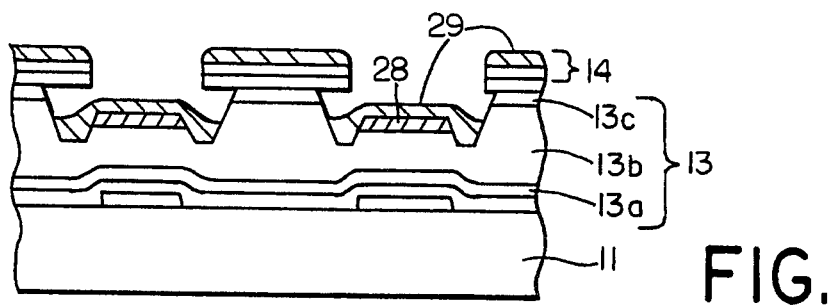
FIG. 8D
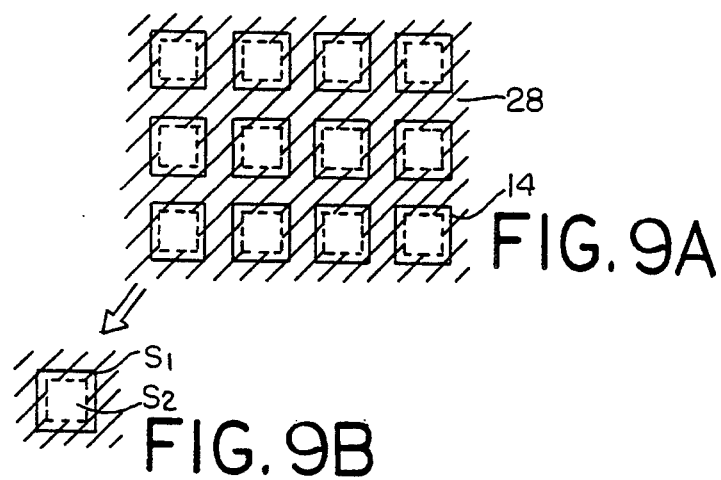
FIG. 9A
FIG. 9B
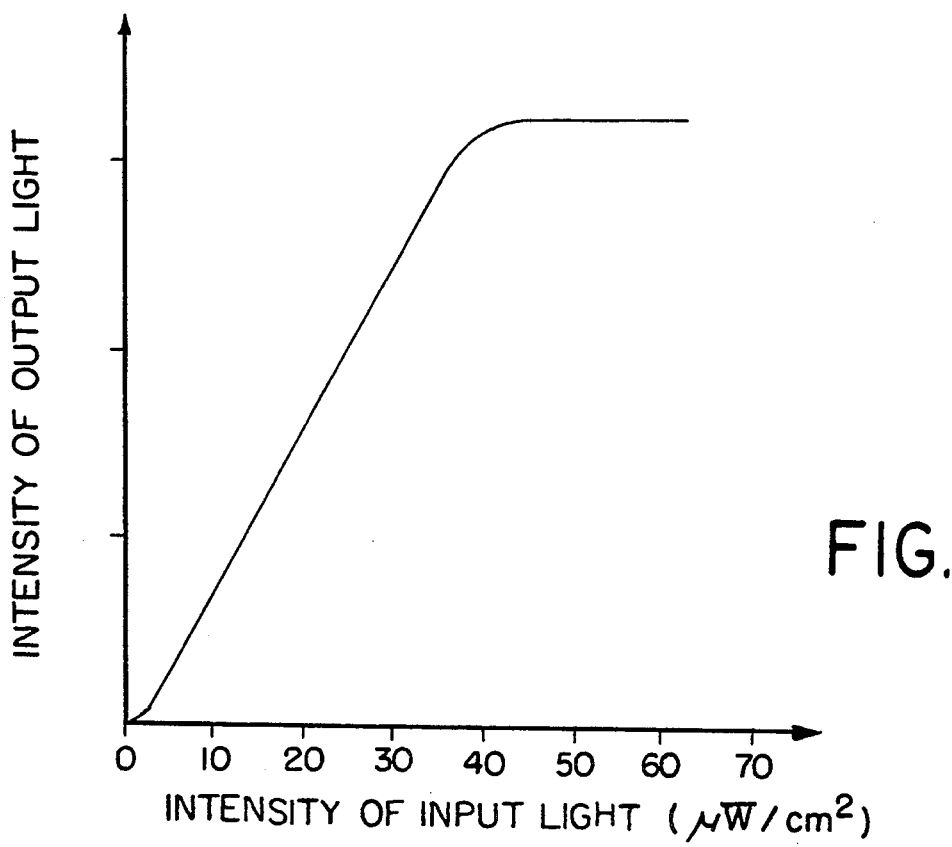
FIG. 10

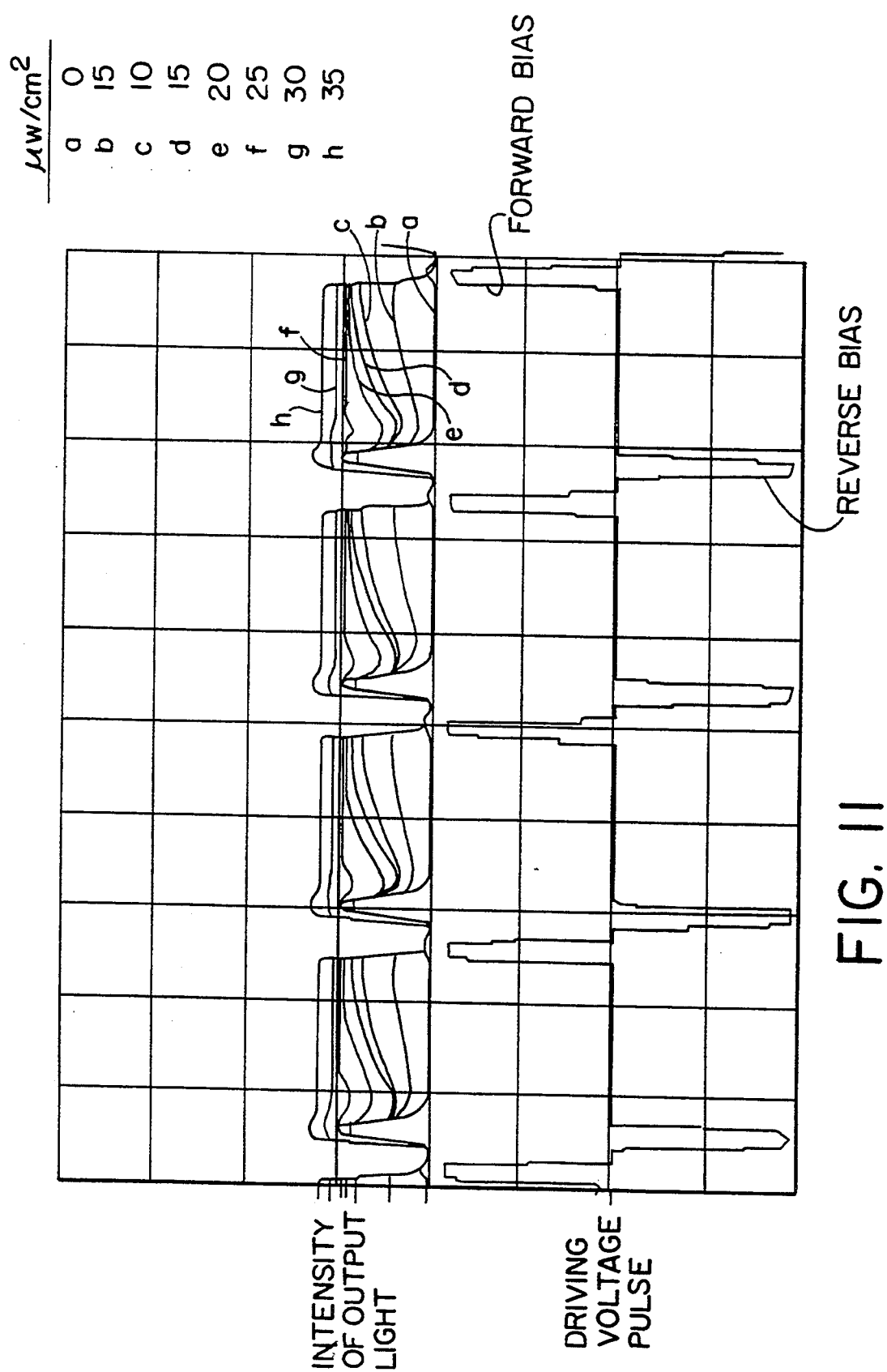

LIQUID CRYSTAL SPATIAL LIGHT MODULATOR WITH ELECTRICALLY ISOLATED REFLECTING FILMS CONNECTED TO ELECTRICALLY ISOLATED PIXEL PORTIONS OF PHOTO CONDUCTOR

BACKGROUND OF THE INVENTION

1. Field of the Invention

The present invention relates to a spatial light modulator and a method for producing the same, and in particular, to a spatial light modulator suitable for use in a projection display apparatus, a holography television apparatus, an optical operation apparatus, and the like.

2. Description of the Related Art

In the field of high definition TV having pixels arranged at a high density for displaying an image on a large image plane, various constructions have been proposed and put into practical use. Projection display apparatuses using a liquid crystal display device instead of a conventional cathode ray tube (hereinafter, referred to as CRT) have actively been developed.

In a display apparatus using a CRT, a higher density of pixels results in a lower luminance of an image plane to darken an image. In contrast, a projection display apparatus using a liquid crystal display device driven by transistors has problems in that it is difficult to enhance the ratio of a total area of pixels with respect to an area of display and that the liquid crystal display device is expensive.

Today, a liquid crystal light valve using a CRT for optical input is a focus of attention for a simple construction and for having advantages of both of the CRT and the liquid crystal display device. An idea of the liquid crystal light valve is disclosed in *Appl. phys. Lett.* 17 (1970) p. 51 by Hughes Aircraft Company. This literature describes a liquid crystal light valve using ZnS as a photoconductive material and a twisted nematic liquid crystal. Another liquid crystal light valve using CdS as a photoconductive material and a twisted nematic liquid crystal is disclosed in *Appl. Phys. Lett.* 22 (1973) p. 90. Liquid crystal light valves using single crystalline silicon and a twisted nematic liquid crystal are disclosed in U. S. Pat. No. 4,913,531, Japanese Laid-Open Patent Publication No. 3-192332, and *J. Appl. Phys.* 57 (1985) p. 1356.

The use of a light valve including a highly sensitive light receiving layer (namely, photoconductive layer) formed of amorphous silicon and a liquid crystal material allows a moving image to be generated on a large image plane having a size of 100 in. (inches) or larger. Electro-optical devices including a light receiving layer formed of amorphous silicon and a twisted nematic liquid crystal are disclosed in Ashey et al., U.S. Pat. No. 4,693,561, *Appl. Opt.* 26 (1987) p. 241, and U.S. Pat. No. 4,538,884. Liquid crystal light valves using amorphous silicon and CdTe are disclosed in U.' S. Pat. No. 4,799,773 and *SID* '90 17A. 2 p. 327 by Hughes Aircraft Company.

The use of a ferroelectric liquid crystal having a high response speed as a liquid crystal material realizes a liquid crystal light valve with a faster response and a higher resolution. Such a light valve utilizing the ferroelectric liquid crystal for an excellent memory function and a high bistability thereof is considered to have a critical role in optical computing, which is a future technology for parallel operation.

A spatial light modulator including a light receiving layer formed of amorphous silicon and having a diode structure and a ferroelectric liquid crystal is disclosed in *Appl. Phys. Lett.* 51 (1987) p. 1232 by a research group of Keio University as the first device of this kind. A construction for such a spatial light modulator is proposed in *SPIE* 754 (1987) p. 207 by the University of Colorado Foundation, Inc. Spatial light modulators developed by the University of Colorado Foundation, Inc. are disclosed in *Appl. Phys. Lett.* 55 (1989) p. 537 and U.S. Pat. No. 4,941,735.

A projection system for writing a TV image is disclosed in *SID* '91 13.3, p. 254 by Greyhawk Systems, Inc.

A holography television apparatus is also a focus of attention as an apparatus for displaying a three-dimensional image which can be seen without 3-D glasses. Especially, a liquid crystal display device is considered as an excellent rewritable hologram recording medium. For example, an electronic holography system was developed by Hashimoto et al. which uses a high density display device as a phase modulation type spatial light modulator. Such a system is disclosed in *SPIE Proc. Vol.* 1461, *Practical Holography V* (1991) pp. 291–302.

A liquid crystal display device driven by a transistor which is currently used has a resolution of 12 to 25 lp/mm. A spatial light modulator having a resolution of 200 lp/mm is now desired.

Liquid crystal light valves including a light receiving layer formed of single crystalline silicon and a liquid crystal material and having microscopic electrodes as pixels are disclosed in U.S. Pat. No. 4,913,531, Japanese Laid-Open Patent Publication No. 3-192332, and *J. Appl. Phys.* 5 (1985) p. 1356. According to this technology, the light receiving layer has a groove which is filled with a liquid crystal layer in order to reduce the level of crosstalk between adjacent pixels and improve the resolution. However, the light receiving layer is restricted to having a construction including a MOS (metal-oxide-semiconductor) structure or a Schottky junction. In the devices proposed in the above literatures, pixel portions are shielded from reading light by pixel electrodes, and an inter-pixel portion between the pixel portions are shielded from the reading light by a metal film.

A spatial light modulator including a single crystalline layer having a groove formed at a surface thereof and an electro-optical crystal layer in order to improve the resolution is disclosed in U.S. Pat. No. 4,619,501. When single crystalline silicon is used for the light receiving layer, the resolution has a limit since the standard thickness of the layer is 100 $\mu$m and a corrugation having a height of several microns cannot be eliminated from the layer even by surface rubbing. Under these circumstances, a spatial light modulator having a light receiving layer formed of amorphous silicon is expected to realize a high resolution because such a light receiving layer can be formed on a glass substrate treated with highly precise optical rubbing and also can be formed in a thickness of several microns.

Examples of a liquid crystal light valve and a spatial light modulator both including a liquid crystal layer and a photoconductive layer, which are provided with microscopic electrodes and a light blocking film are disclosed in Japanese Laid-Open Patent Publication No. 62-40430 and Japanese Laid-Open Patent Publication No. 62-169120, respectively. The microscopic electrodes are advantageous in being easier to produce than a reflective layer formed of a multi-layer dielectric thin film, in having no dependency on incident angle, and in having a high reflective power. When such a conventional spatial light modulator is used in a projection display apparatus, a high definition TV image can be obtained because the spatial light modulator has a high ratio of a total area of pixels with respect to an area of display, and pixels of a clear shape.

Such a spatial light modulator is generally considered to need two types of light blocking films. The first one is an input light blocking film provided for prevent superimposition of the input light to be modulated on the output light. The second one is an output light blocking film provided for prevent reading light from being leaked to the light receiving layer and thus to prevent switching of the spatial light modulator. In the case when the light blocking films are provided between the light receiving layer and a reflective film, the light blocking films are formed of an insulating material. In the case when the light blocking films are directly provided on a transparent electrode, the light blocking films need not have electric insulation.

The followings are considered to limit the resolution of the spatial light modulator.

(1) Lateral diffusion of electrical carriers generated in the light receiving layer;

(2) Drifting of electrical carriers across a junction interface formed in the light receiving layer;

(3) Crosstalk between adjacent pixels caused by a leak of the electric field; and (4) Size of a minimum domain of the ferroelectric liquid crystal; etc.

Especially in a spatial light modulator having a reflecting film divided into pixel units, the resolution is significantly lowered by the diffusion of and the drifting of the electrical carriers. The limit of the resolution determined by the above-mentioned elements determines the pixel density of the spatial light modulator.

In a spatial light modulator including a photoconductive layer acting as a rectifier, a ferroelectric liquid crystal layer, and a metal reflecting film provided in a plane sandwiched therebetween and divided into pixel units, an image having high density pixels is generated at a high response speed when the ohmic connection between the photoconductive layer and the metal reflecting film occurs. However, such a spatial light modulator has problems concerning the method for blocking the reading light, high resolution, prevention of generation of defects specific to the ferroeleotric liquid crystal, uniform thickness required for a satisfactory contrast ratio and an excellent alignment, and resistance against impact.

In order to effectively block input light, a construction including a light blocking film formed of an electric insulating material in a uniform thickness provided between a photoconductive layer and a metal reflecting film is disclosed in, for example, Japanese Laid-Open Patent Publication No. 62-40430. Such a light blocking film blocks both of the input light and the output light. Such a construction is advantageous in being easy to produce, but problems occur in that the photoconductivity and the switching performance are declined by accumulation of electric carriers when the spatial light modulator is driven, due to the insulation between the photoconductive layer and the metal reflecting film.

In a spatial light modulator having no light blocking film on pixel portions (for example, the modulator disclosed in Japanese Laid-Open Patent Publication No. 62-169120), there is no need for an electric insulating layer. However, the photoconductive film is formed of a high polymer containing a coloring matter or carbon because a conductive material is not suitable for the photoconductive film. Generally, the light blocking degree is increased in accordance with an increase in the amount of carbon, but the amount ratio of carbon with respect to the high polymer has an upper limit due to .film forming conditions, and the light blocking degree also has an upper limit. In the case when the light blocking film is formed of a metal, substantially complete light blocking is achieved over a visible light region when the thickness of the film is several hundred nanometers. However, according to the conventional spatial light modulators, the output light blocking film cannot be formed of a photoconductive material.

SUMMARY OF THE INVENTION

A spatial light modulator according to the present invention includes a first electrode; a second electrode opposed to the first electrode; a photoconductive layer electrically connected to the first electrode and including a plurality of pixel portions and an inter-pixel portion between the pixel portions, the pixel portions being electrically isolated from one another by the inter-pixel portion; a plurality of reflecting films electrically connected to the pixel portions of the photoconductive layer respectively, the reflecting films being electrically isolated from one another; and a liquid crystal layer interposed between the reflecting films and the second electrode. The pixel portions each have a rectifying function between the reflecting film connected thereto and the first electrode.

A method for producing a spatial light modulator according to the present invention includes the steps of laminating a plurality of layers to form a photoconductive layer having a diode structure; and selectively etching a specified area of at least one of the plurality of layers to obtain a plurality of pixel portions with no part thereof being etched and an inter-pixel portion for substantially electrically isolating the pixel portions from one another, the inter-pixel portion being obtained between the pixel portions.

Thus, the invention described herein makes possible the advantages of providing (1) a spatial light modulator for displaying a high density image at a high speed response, and a method for producing the same; and (2) a spatial light modulator having excellent blocking for reading light, for displaying an image having a high resolution and a satisfactory contrast ratio, and a method for producing the same. These and other advantages of the present invention will become apparent to those skilled in the art upon reading and understanding the following detailed description with reference to the accompanying figures.

BRIEF DESCRIPTION OF THE DRAWINGS

FIG. 4 is a cross sectional view schematically illustrating still another spatial light modulator according to the present invention.

FIG. 5 is a schematic view illustrating a projection display apparatus including a spatial light modulator according to the present invention.

FIG. 6 is a schematic view illustrating a holography television apparatus including a spatial light modulator according to the present invention.

FIGS. 8A through 8D are views illustrating a method for producing the spatial light modulator shown in FIG. 7.

FIG. 9A and 9B is a plan view illustrating an output light blocking film and reflecting films of FIG. 7. FIG. 10 is a graph illustrating the relationship between the intensity of output light and the intensity of input light at a constant level of voltage.

FIG. 11 is a graph illustrating the relationship between the driving voltage and the response time of the output light.

DESCRIPTION OF THE PREFERRED EMBODIMENTS

Hereinafter, the present invention will be described by way of illustrating examples with reference to the accompanying drawings.

EXAMPLE 1

Figure 1:
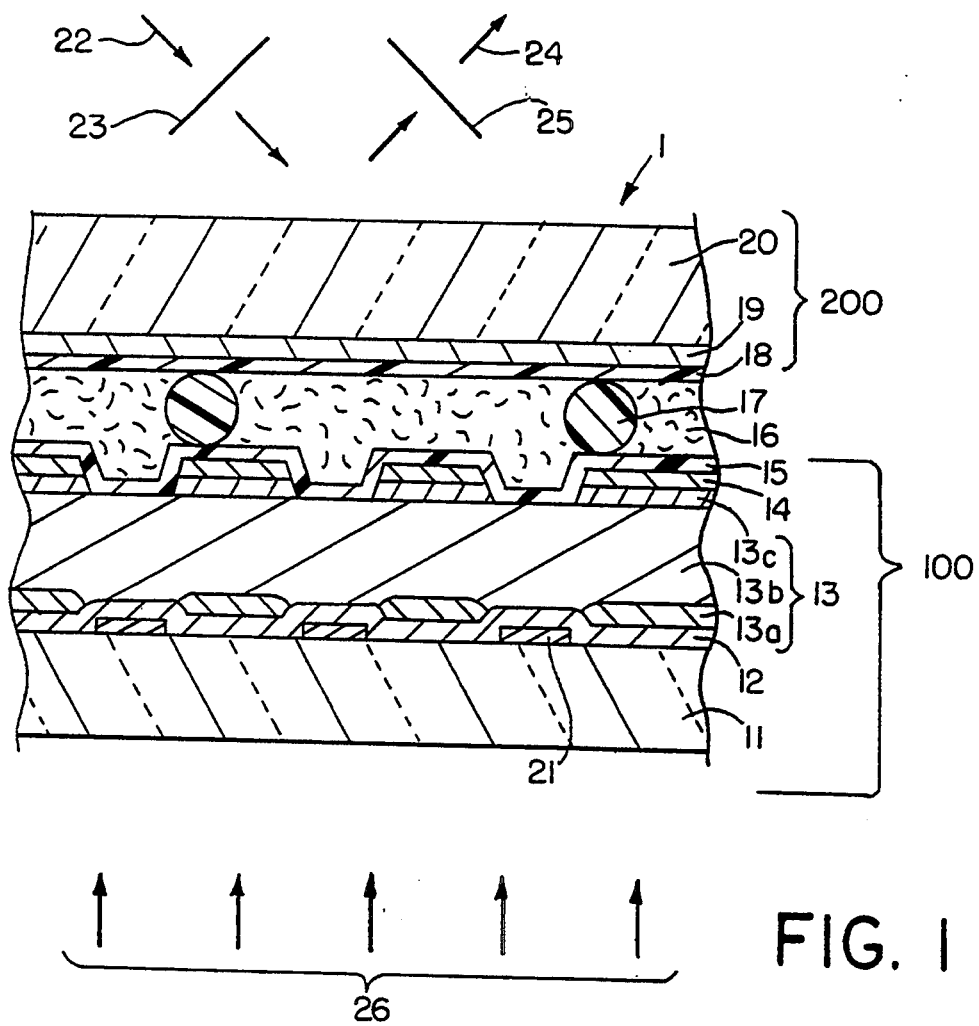
FIG. 1 is a cross sectional view schematically illustrating a spatial light modulator according to the present invention.

FIG. 1 schematically shows a cross section of a spatial light modulator (hereinafter, referred to as the SLM) 1 according to a first example of the present invention. The SLM 1 includes a first panel 100, and a second panel 200, and a ferroeleotric liquid crystal (hereinafter, referred to as the FLC) layer 16. Writing light 26, which is incident on the first panel 100 from below, is used for writing an optical image into the FLC layer 16. Reading light 22 is used for reading the optical image written into the FLC layer 16. The reading light 22 is emitted toward the second panel 200 from above and linearly polarized by a polarizer 23 before being incident on the SLM 1. Then, the reading light 22 is transmitted through the FLC layer 16, reflected by reflecting films 14, and transmitted again through the FLC layer 16 to be out of the SLM 1. Thereafter, the reading light 22 is transmitted through an analyzer 25 to be an output light 24. Image data written into the FLC layer 16, namely, the optical image is read out based on an intensity distribution of the output light 24.

The first and the second panels 100 and 200 will be described in detail. The first panel 100 includes a transparent insulating substrate 11, a light blocking film 21 provided on the transparent insulating substrate 11, a transparent conductive electrode 12 (acting as a first electrode) provided on the transparent insulating substrate 11 so as to cover the light blocking film 21, a photoconductive layer 13 provided on the transparent conductive electrode 12, a plurality of the reflecting films 14 provided on the photoconductive layer 13, and an alignment film 15 provided on the photoconductive layer 13 so as to cover the reflecting films 14.

The transparent insulating substrate 11 is preferably formed of an inorganic material such as glass, but may be formed of an organic material such as a plastic material. The transparent conductive electrode 12 is formed of, for example, ITC (indium tin oxide) or $SnO_x$.

The light blocking film 21 has a plurality of apertures, and the apertures correspond to pixels, respectively. The writing light 26 transmitted through the transparent insulating substrate 11 passes through the apertures of the light blocking film 21 to be incident on the photoconductive layer 13. The writing light 26 incident on the photoconductive layer 13 through the apertures generates electrical carriers (electrons and holes) at portions of the photoconductive layer 13, the portions corresponding to the apertures, respectively. Such portions of the photoconductive layer 13 will be referred to as the pixel portions, hereinafter. The amount of the electrical carriers depends on the intensity of the writing light 26.

The photoconductive layer 13 includes an i-layer 13b having two main surfaces which are substantially parallel to each other, a plurality of p-layers 13a provided on one of the main surfaces of the i-layer 13b, and a plurality of n-layers 13c provided on the other main surface of the i-layer 13b. The n-layers 13c ere opposed to the p-layers 13a, respectively, through the i-layer 13b. As is described above end as is shown in FIG. 1, the pixel portions of the photoconductive layer 13 each have a three-layer structure including the p-layer 13a, the i-layer 13b, and the n-layer 13c. In contrast, an inter-pixel portion between the pixel portions (hereinafter, referred to simply as the inter-pixel portion) has a single layer structure of the i-layer 13b. According to the first example of the present invention, in each pixel portion, the layers having a low resistance, namely, the p-layer 13a and the n-layer 13c are electrically isolated from each other by a layer having a high resistance, namely, the i-layer 13b. Consequently, electrical carriers generated in a pixel portion of the photoconductive layer 13 are not transferred to the other pixel portions.

The photoconductive layer 13 according to the first example is formed of a lamination of amorphous silicon films, which is suitable for use in a display apparatus having a large image plane. Since amorphous silicon has a quantum efficiency for photocurrent generation of approximately 1, which is ideal, amorphous silicon is especially suitable for the photoconductive layer 13.

Generally, for sealing FLC molecules between a pair of glass substrates to put the FLC molecules into a surface-stabilized alignment, a precision of approximately 1/10 µm or less is demanded. Even a slight warp of glass causes a problem. Amorphous silicon has a compressive stress, but can alleviate the compressive stress by introduction of impurities such as hydrogen. Therefore, amorphous silicon does not lower the assembly precision of the glass substrates to such a degree as to have an adverse effect on the alignment of the FLC molecules. However, the introduction of impurities has an undesired possibility of lowering the optical sensitivity. According to the present invention, an upper surface of the inter-pixel portion is at a level lower than a level of upper surfaces of the pixel portions. In other words, the inter-pixel portion is etched to be a groove. In such a construction, the compressive stress is alleviated entirely in the photoconductive layer 13. As a result, the assembly precision of the glass substrates is enhanced.

Instead of silicon (Si), the photoconductive layer 13 is formed of a compound semiconductor such as CdS, CdTe, CdSe, ZnS, ZnSe, GaAs, GaN, GaP, GaAlAs, or InP, an amorphous semiconductor such as Se, SeTe, or AsSe, or a polycrystalline semiconductor such as Ge, $Si_{1-x}C_x$, $Si_{1-x}Ge_x$, or $Ge_{1-x}C_x$ ($0<x<1$). Further examples which can be used for the photoconductive layer 13 include the following organic semiconductors:
(1) Phthalocyanine pigments (hereinafter, referred to as Pc) such as nonmetallic Pc, XPc (X=Cu, Ni, Co, TiO, Mg, Si(OH), etc.), AlClPc, TiOClPcCl, InClPcCl, InClPc, InBrPcBr, etc.;
(2) Azo coloring matters such as mono azo and dis azo coloring matters;
(3) Perylene pigments such as perylenic acid anhydride and perylenic imide;
(4) Indigoid dyes;
(5) C.I. Pigment Violet 1;
(6) Polycyclic quinones such as anthraquinone and pyrenequinone;
(7) Cyanine coloring matters;
(8) Xanthene dyes;
(9) Charge-transfer complexes such as PVK/TNF;
(10) Eutectic complex formed of a pyrylium salt dye and polycarbonate resin; and
(11) Azulenium salt compound.

In the case when the amorphous semiconductor such as Si, Ge, $Si_{1-x}C_x$, $Si_{1-x}Ge_x$, or $Ge_{1-x}C_x$ is used for the photoconductive layer 13, hydrogen or halogen may be contained in the amorphous semiconductor. Oxygen or nitrogen may be contained in the amorphous semiconductor in order to lower the dielectric constant and increase the resistance of the photoconductive layer 13. In order to control the resistance, the amorphous semiconductor may be doped with B, Al, Ga, or other p-type impurities or with P, As, Sb or other n-type impurities.

The photoconductive layer 13 having a p/n, p/i, i/n, or p/i/n homo-junction may be formed by laminating semiconductor layers doped with impurities. When a depletion layer is generated in the vicinity of the homo-junction, the dielectric constant, the dark resistance and the polarity of the operating voltage are controlled. Alternatively, the photoconductive layer 13 having a hetero-junction may be formed by laminating layers formed of different semiconductor materials selected from the above-mentioned ones. The photoconductive layer 13 preferably has a thickness in the range of 0.1 to 10 µm.

The reflecting films 14 are provided on and electrically connected to the n-layers 13c, respectively. The reflective films 14 are electrically isolated from one another, and can have different electrical potentials from one another. As described later, the difference between the electrical potential of each reflecting film 14 and the electrode potential of a transparent conductive electrode 19 is changed in accordance with the electrical potential of each reflecting film 14. Therefore, the electrical potential of each reflecting film 14 influences the optical characteristics of a pixel portion of the FLC layer 16 corresponding to the reflecting film 14. Since the reflecting films 14 each reflect the reading light 22 and regulate the pixels, the reflecting films 14 are also referred to as pixel electrodes. The reflecting films 14 also act as blocking films for preventing the reading light 22 from being incident on the pixel portions of the photoconductive layer 13. The reflecting films 14 are preferably formed of a material which is both electrically conductive and optically reflective, for example, a metal thin film of aluminum, chrome, titanium or the like.

The second panel 200 includes a transparent insulating substrate 20, the transparent conductive electrode 19 (acting as a second electrode) provided on the transparent insulating substrate 20, and an alignment film 18 provided on the transparent conductive electrode 19. The alignment films 15 and 18 are provided in order to align molecules of the FLC layer 16 to be parallel to the layers and films of the SLM 1. The alignment films 15 and 18 may be formed of a polymer such as nylon, polyimide or the like, or of $SiO_2$ deposited by an oblique deposition method. The alignment films 15 and 18 preferably have a thickness of 100 nm or less each, more preferably a thickness of 10 nm or less each.

The first and the second panels 100 and 200, more accurately, the alignment films 15 and 18 have spacers 17 therebetween. A diameter of the spacers 17 determines the distance between the first and the second panels 100 and 200, namely, a cell thickness. In the case when the SLM 1 is used for a reflection display apparatus, the contrast ratio of an image generated by the output light 24 is increased when the diameter of the spacers 17 is 1 µm. Although ferroelectric chiral smectic C liquid crystal is used as the liquid crystal material in the first example of the present invention, other liquid crystal materials can also be used.

The SLM 1 is operated in the following manner.

In FIG. 1, while the pixel portions of the photoconductive layer 13 each have a pin structure (including the p-layer 13a, the i-layer 13b, and the n-layer 13c) acting as a rectifier, the inter-pixel portion of the photoconductive layer 13 has a high resistance structure (including only the i-layer 13b). In other words, the pixel portions of the photoconductive layer 13 are substantially electrically isolated from one another by the inter-pixel portion of the photoconductive layer 13. When the transparent conductive electrodes 12 and 19 of the SLM 1 are applied with a reverse bias voltage and the SLM 1 is illuminated with the writing light 26, electrical carriers (electrons and holes) are generated in the photoconductive layer 13. The electrons are drifted into the n-layer 13c, and the holes are drifted into the p-layer 13a. As a result, a photocurrent flows between the transparent conductive electrodes 12 and 19, thereby changing the electrical potentials of the reflecting films 14.

According to the first example of the present invention, since the inter-pixel portion of the photoconductive layer 13 is formed only of the i-layer 13b, the electrical carriers generated in each pixel portion of the photoconductive layer 13 are not laterally diffused into the pixel portions adjacent thereto. Thus, crosstalk between the pixels is prevented.

According to the present invention, since the pixel portions of the photoconductive layer 13 have a pin structure acting as a rectifier in the SLM 1 including the FLC layer 16, the switching speed of the SLM 1 can remarkably be improved. By applying a forward voltage to the pixel portions, acting as rectifiers, of the photoconductive layer 13, a large electric field can be applied to the FLC layer 16, thus to forcibly put the FLC molecules into an initial alignment. In contrast, if a reverse voltage is applied to the pixel portions of the photoconductive layer 13, the pixel portions receiving the writing light 26 are put into a low resistance state, thereby inverting the alignment of the FLC molecules of the pixel portions of the FLC layer 16. Since the inter-pixel portion receiving no writing light 26 is kept in a high resistance state, alignment of the FLC molecules of the inter-pixel portion of the FLC layer 16 is not inverted. Such inversion and non-inversion of the FLC molecules forms an alignment pattern in the FLC layer 16. The resultant alignment pattern is read out as an optical output.

With reference to FIGS. 2A through 2D, a method for producing the SLM 1 shown in FIG. 1 will be described.

As the transparent insulating substrate 11, a glass substrate having a size of 55 mm (length)×45 mm (width)×1.1 mm (thickness) is used. First, a chrome film (thickness: 100 nm) is formed on an entire surface of the transparent insulating substrate 11 by sputtering. Hereinafter, the transparent insulating substrate 11 having one or more layers and films formed thereon will be referred to as the "substrate" for simplicity.

Figure 2A:
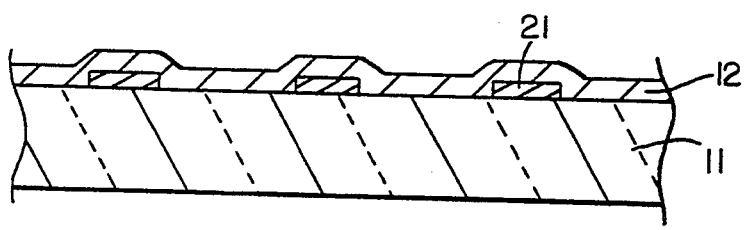
FIGS. 2A through 2D are views illustrating a method for producing the spatial light modulator shown in FIG. 1.

As is shown in FIG. 2A, a plurality of apertures are formed in the chrome film by photolithography to obtain the light blocking film 21. The apertures each have a size of 40 μm×40 μm and are two-dimensionally arranged at a pitch of 45 μm. The apertures correspond to the pixels, respectively. Next, an ITO film (thickness: 100 nm) is formed on the transparent insulating substrate 11 so as to cover the light blocking film 21, thereby forming the transparent conductive electrode 12.

Figure 2B:
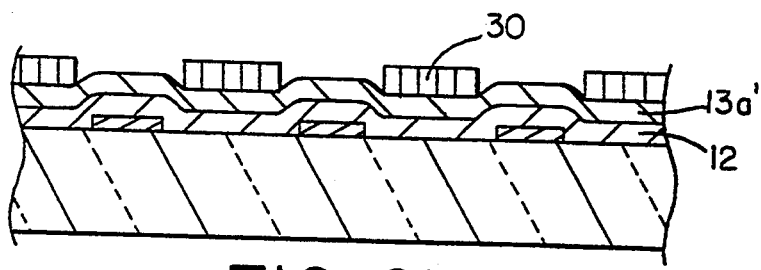
Figure 2C:
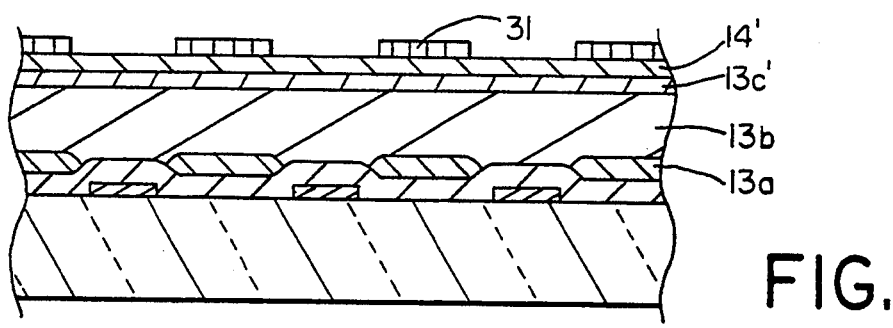

Then, as is shown in FIG. 2B, a p-type hydrogenated amorphous silicon film 13a' (thickness: 50 nm) is formed on the transparent conductive electrode 12 by plasma CVD. The p-type hydrogenated amorphous silicon film 13a' contains boron in an amount of 1000 ppm diffused in an effective portion of 35 mm x 35 mm thereof. After the resultant substrate is taken out from a plasma CVD apparatus, a resist pattern 30 regulating a pixel pattern is formed on the p-type hydrogenated amorphous silicon film 13a' by photolithography. The p-type hydrogenated amorphous silicon film 13a' is etched using the resist pattern 30 as a mask to form the p-layers 13a on areas of the transparent conductive electrode 12 corresponding to the pixels as is shown in FIG. 2C.

After the resist pattern 30 is removed, the resultant substrate is again inserted into the plasma CVD apparatus to sequentially form the i-layer 13b (thickness: 2 μm) and the n-film 13c' (thickness: 200 nm) on the resultant substrate. The i-layer 13b is formed of an i-type hydrogenated amorphous silicon with no impurities, and the n-film 13c' is formed of an n-type hydrogenated amorphous silicon doped with phosphorus as an impurity. Then, an aluminum thin film 14' (thickness: 150 nm) is formed on the n-film 13c' by electron beam evaporation, and a resist pattern 31 is formed on areas of the aluminum thin film 14' corresponding to the pixels by photolithography as is shown in FIG. 2C.

Figure 2D:
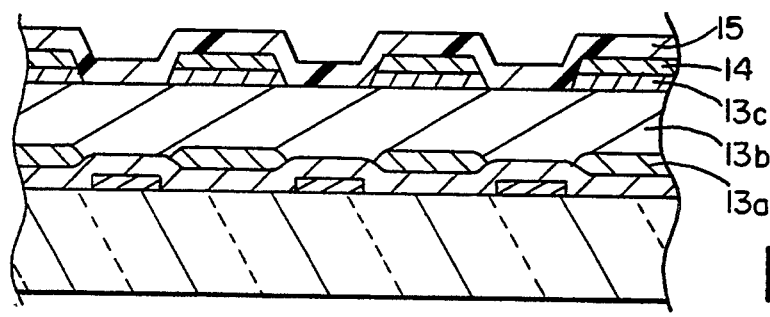

The aluminum thin film 14' and the n-film 13c' are etched using the resist pattern 31 as a mask. Thus, the n-layers 13c are formed so as to cover areas of the i-layer 13b corresponding to the p-layers 13a, and the reflecting films 14 of aluminum are formed on the n-layers 13c as is shown in FIG. 2D. The aluminum thin film 14' is patterned by wet etching using an acid liquid, and the n-film 13c' is patterned by wet etching using a solution including hydrogen fluoride or reactive ion etching (RIE) using $CF_4$ and oxygen.

Next, as is shown in FIG. 2D, the alignment film 15 is formed so as to cover the n-layers 13c, the reflecting films 14, and exposed portions of the i-layer 13b (the inter-pixel portion). The alignment film 15 is formed of, for example, a polyimide film. The polyimide film is typically formed in the following manner.

First, a substrate is coated with polyamic acid, which is a precursor of polyimide, by use of a spinner so as to have a thickness of 20 nm or less. Then, the substrate coated with polyamic acid is heated, for example, at 230° C. for an hour in an oven in order to imidize polyamic acid into a polyimide film.

Concerning the second panel 200, the transparent conductive electrode 19 of ITO is formed by sputtering on the transparent insulating substrate 20 formed of glass, and then the alignment film 18 is formed on the transparent conductive electrode 19 in the same manner as for the first panel 100. The alignment films 15 and 18 are rubbed in an identical direction by a nylon cloth.

With reference to FIG. 1, a method for forming the FLC layer 16 will be described.

First, the spacers 17 each formed of a bead having a diameter of 1 μm dispersed in isopropylalcohol are sprayed toward a surface of the alignment film 18 of the second panel 200. Peripheries of the first and the second panels 100 and 200 are coated with a UV-curing resin, thereby adhering the first and the second panels 100 and 200 to each other. The UV-curing resin is cured by UV radiation, thereby forming a cell including the first and the second panels 100 and 200 facing each other with a distance of 1 μm therebetween. Under vacuum, the FLC is injected into the cell. As the FLC, ZLI-3645 produced by Merck & Co., Inc. or the like is used. After the injection, in order to uniformly align the FLC molecules, the temperature of the FLC is raised to a phase transition temperature of the FLC (62° C. in the case of ZLI-3645) or higher, and then gradually lowered to room temperature at a speed of 1° C./min. or less. By such a treatment, the FLC molecules can be realigned in a specified orientation.

FIG. 5 schematically shows a projection display apparatus using the SLM 1 produced in the above-mentioned manner. The projection display apparatus with the SLM 1 was evaluated for performance. The projection display apparatus includes a metal halide light source 40 for emitting the reading light 22, a condenser lens 41 for collimating the reading light 22 from the metal halide light source 40, a polarizing beam splitter 42 for receiving the collimated reading light 22 and also changing a direction of the reading light 22 reflected by the SLM 1, a lens 44 for projecting the light from the polarizing beam splitter 42 on a screen 45, and a CRT display 43 for emitting the writing light 26.

The writing light 26 is emitted from the CRT display 43 toward the SLM 1, thereby writing an optical image in the FLC layer 16 in the SLM 1. The optical image written in the FLC layer 16 is read out in the following manner.

The reading light 22 emitted from the metal halide light source 40 is collimated by the condenser lens 41, transmitted through the polarizing beam splitter 42 and incident on the SLM 1. The reading light 22 transmitted through the FLC layer 16 of the SLM 1 is reflected by the reflecting films 14 and then is incident on the polarizing beam splitter 42. Then, the reading light 22 is enlarged by the lens 44 and regenerates the image on the screen 45.

When pixels of an image plane of the CRT display 43 are written in %he pixels of the SLM 1 isolated from one another and read out, the pixels on the screen 45 are rectangular because the reflecting films 14 are rectangular. Since the ratio of a total area of pixels with respect to an area of display is substantially 80%, an image magnified to a size corresponding to 100 in. was bright with a light flux of 2000 lm (lumens). In the projection display apparatus in FIG. 5 including the SLM 1, the image on the screen 45 had a contrast ratio of 250:1 and a resolution of 560 lateral TV lines. In the case when a moving image was projected, no after image was generated with respect to the video rate, and a clear image having a high luminance was obtained. In order to obtain a color image, three sets of the CRT display 43 and the SLM 1 were prepared for the RGB colors. A color image was obtained by synthesizing three images corresponding to the RGB colors on the screen 45.

EXAMPLE 2

Another SLM was produced in the same manner as in the first example. In the SLM according to a second example, the pixels each having a size of 8 $\mu$m $\times$ 8 $\mu$m are two-dimensionally arranged at a pitch of 10 $\mu$m in a total number of 3200 pcs. $\times$ 3200 pcs. ($=10^7$) or more. A photographic image for resolution evaluation was written in the SLM, and the written image was read out. It was confirmed that a resolution of 100 (1 p/mm) was achieved.

EXAMPLE 3

Figure 3:
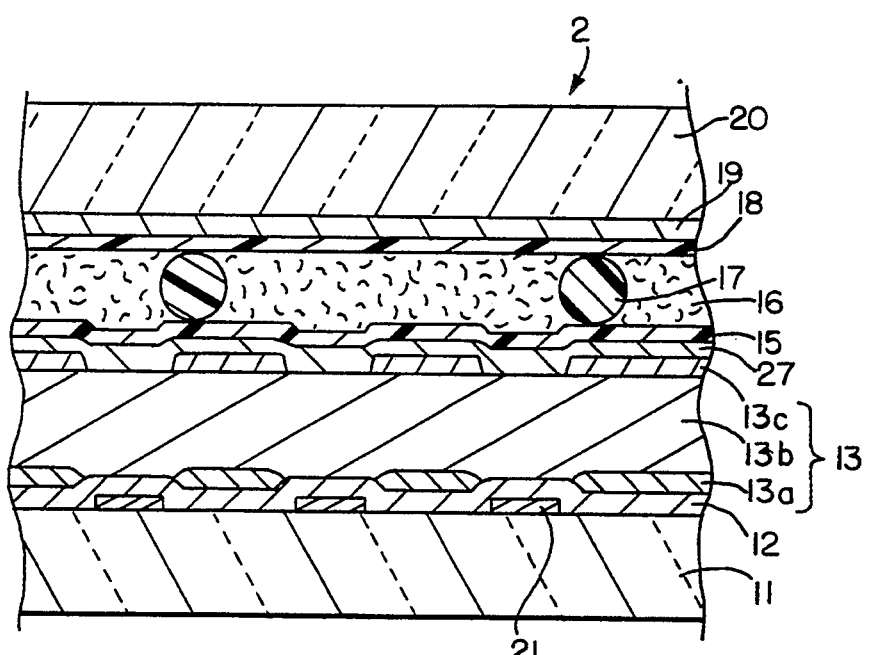
FIG. 3 is a Cross sectional view schematically illustrating another spatial light modulator according to the present invention.

FIG. 3 schematically shows a cross section of an SLM 2 according to a third example of the present invention. In FIG. 3, elements corresponding to those in FIG. 1 bear identical reference numerals, respectively. In the third example, the reflecting films 14 of FIG. 1 are replaced with a dielectric reflecting film 27 formed of ZnS films and MgF$_2$ films alternately laminated. The dielectric reflecting film 27 is formed by, for example, electron beam evaporation. According to the SLM 2 in FIG. 3, a reflectivity of 90% or more was achieved due to the use of the dielectric reflecting film 27. Such a high reflectivity enhanced the luminance of the image, and further realized a resolution of 100 (1 p/mm ).

EXAMPLE

FIG. 4 schematically shows a cross section of an SLM 3 according to a fourth example of the present invention. In FIG. 4, elements corresponding to those in FIG. 1 bear identical reference numerals, respectively. The SLM 3 is distinct from the SLM 1 (FIG. 1) in the shape of the p-layer 13a. While the p-layer 13a of the SLM 1 is patterned to exist only at portions of photoconductive layer 13 corresponding to the pixels, the p-layer 13a of the SLM 3 is uniformly formed on an entire surface of the transparent conductive electrode 12.

The SLM 3 shown in FIG. 4 is produced in the same manner as is shown in FIGS. 2A through 2D except the process for forming the p-layer 13a. The p-layer 13a, the i-layer 13b, and the n-layers 13c are sequentially formed, preferably in an identical apparatus. The photoconductive layer 13 produced in such a manner has a p/i structure in the inter-pixel portion corresponding to the light blocking film 21.

By forming the pixels so as to have a rectangular shape of 8 $\mu$m $\times$ 8 $\mu$m as in the second example, the SLM 3 having a resolution of 100 (1 p/mm) was produced. According to the fourth example, since the process for patterning the p-layer 13a is eliminated, an SLM having a high resolution can be produced in a simpler manner than in the first example. Such a result suggests that the resolution is mainly lowered by lateral drifting of electrons between the n-layers 13c in an SLM having a light receiving layer (namely, a photoconductive layer) formed of amorphous silicon.

EXAMPLE 5

A holography television apparatus including the SLM 1 according to the present invention was evaluated for performance. The holography television apparatus schematically shown in FIG. 6 includes a He—Ne laser 51 for writing an optical image into the SLM 1. Coherent light from the He—Ne laser 51 is divided into two light fluxes by a half mirror 52. One of the light fluxes is reflected by a mirror 53a, transmitted through a lens 56 and an object 50 to be displayed and incident on a CCD 58. The other light flux is reflected by a mirror 53b, transmitted through a beam expander including lenses 54 and 55, and incident on the CCD 58 as reference light through a half mirror 57. As a result, an interference fringe pattern is generated on an image plane of the CCD 58. An image of the interference fringe pattern is converted into an electric signal and transferred to a CRT 55 for regeneration.

An image data concerning the interference fringe pattern regenerated on an image plane of the CRT 65 is written into the SLM 1 through a lens 66. In the SLM 1 used in this holography television apparatus, pixels having a size of 8 $\mu$m $\times$ 8 $\mu$m are arranged at a pitch of 10 $\mu$m in a total number of 3200 pcs. $\times$ 3200 pcs. (=approximately $10^7$).

The optical image written into the SLM 1 is read out in the following manner.

Coherent light emitted from a He—Ne laser 61 is transmitted through a beam expander including lenses 62 and 63 and incident on the SLM 1 through a polarizing beam splitter 64. Then, the light modulated in the SLM 1 into output light is transmitted through the polarizing beam splitter 64 and a lens 67 to be observed as a three-dimensional image in a reflecting mode.

Thus, according to the holography television apparatus of the fourth example, a three-dimensional image can be regenerated in real time. Further, the movement of the object 50 can be observed by real time hologram. According to the holography television apparatus including the SLM 1, a ratio of a total area of pixels with respect to an area of display of 64%, a contrast ratio of 200:1, and a resolution of 100 (1 p/mm) were achieved.

EXAMPLE 6

Figure 7:
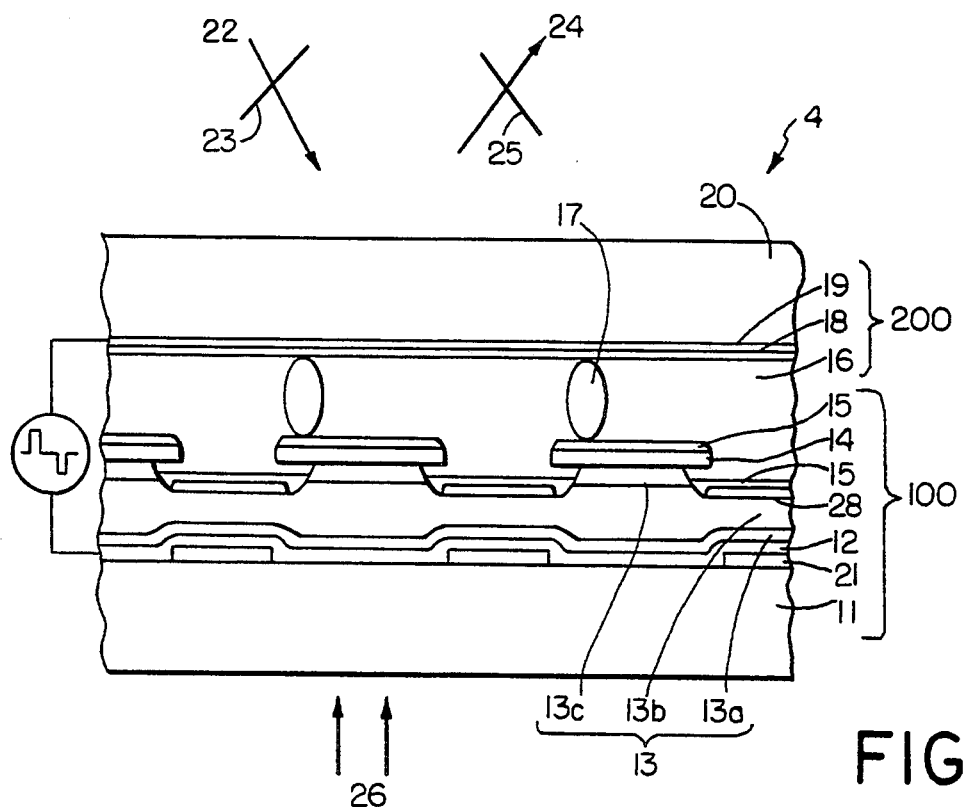
FIG. 7 is a cross sectional view schematically illustrating still another spatial light modulator according to the present invention.

FIG. 7 schematically shows a cross section of an SLM 4 according to a sixth example of the present invention. In FIG. 7, elements corresponding to those in FIG. 1 bear identical reference numerals, respectively.

The first panel 100 of the SLM 4 includes the transparent insulating substrate 11, the light blocking film 21 provided on the transparent insulating substrate 11, the transparent conductive electrode 12 provided on the transparent insulating substrate 11 so as to cover the light blocking film 21, the photoconductive layer 13 provided on the transparent conductive electrode 12, the reflecting films 14 provided on the pixel portions of the photoconductive layer 13, an output light blocking film 28 provided on the interpixel portion of the photoconductive layer 13, and the alignment film 15 provided on the reflecting films 14 and on the output light blocking film 28. The second panel 200 has an identical structure with the one shown in FIG. 1.

The writing light 26 is incident on the SLM 4 to write an optical image as an image data into the photoconductive layer 13. As the intensity of the writing light 26 is stronger, the resistance of the photoconductive layer 13 is lower. When the SLM 4 is illuminated by the writing light 26, the electrical potentials of the reflecting films 14 of a microscopic size are changed, thereby raising the voltage which is applied between the reflecting films 14 and portions of the transparent conductive electrode 19 corresponding to the reflecting films 14. Therefore, the raised voltage is applied to the pixel portions of the FLC layer 16 interposed between the reflecting films 14 and the above-mentioned portions of the transparent conductive electrode 19. In accordance with the level of the voltage, the alignment of the FLC molecules is changed. The output light blocking film 28 is provided on the inter-pixel portion of the photoconductive layer 13 in order to prevent voltage switching of the photoconductive layer 13 from occurring by the reading light 22. The pixel portions of the photoconductive layer 13 are shielded by the reading light 22 by the reflecting films 14.

The light blocking film 21 is provided below the inter-pixel portion of the photoconductive layer 13 in order to prevent the writing light 26 from being leaked to the inter-pixel portion, and thus to prevent crosstalk between the pixels.

In the photoconductive layer 13, the pixel portions corresponding to the reflecting films 14 and the inter-pixel portion corresponding to the output light blocking film 28 have different thicknesses from each other. More practically, since an upper surface of the inter-pixel portion is at a level lower than a level of upper surfaces of the pixel portions, the reflecting films 14 and the output light blocking film 28 are electrically isolated from each other. As a result, crosstalk between the adjacent pixels is prevented.

The photoconductive layer 13 of the sixth example is formed of amorphous silicon. The pixel portions thereof each have a pin structure including the p-layer 13a, the i-layer 13b, and the n-layer 13c. In the inter-pixel portion, at least the n-layers 13c are completely removed, thus to eliminate an i/n interface. Accordingly, leak current flowing along the i/n interface is eliminated, thereby drastically reducing the level of crosstalk between the adjacent pixels. The output light blocking film 28 is formed on a bottom of the groove obtained by such a structure.

If the output light blocking film 28 is formed without completely eliminating the n-layers 13c, a conductive channel of the n-layer 13c—the output light blocking film 28—the n-layer 13c is generated, thereby possibly raising the level of crosstalk between the pixels.

FIGS. 9A and 9B are a view of the SLM 4 as seen from the reading side (the side of the panel 200). As is shown in FIGS. 9A and 9B, the output light blocking film 28 indicated by hatching is formed so as to be put in below peripheries of the reflecting films 14 corresponding to the pixel portions. In other words, an area $S_1$ of each reflecting film 14 is larger than an area $S_2$ of a portion of the photoconductive layer 13 in contact with the reflecting film 14 due to the existence of the output light blocking film 28. Accordingly, the reading light 22 is prevented from being incident on side walls of the groove in the photoconductive layer 13 as leaked light. As a result, image data stored in the FLC layer 16 is not changed by the leaked light of the reading light 22 before the image data is read out.

Since the output light blocking film 28 is formed in a uniform thickness, it is possible to align the FLC molecules in a certain orientation by externally controlling the electrical potential of the output light blocking film 28. The electrical potential of the output light blocking film 28 can be set so that the light reflected by the output light blocking film 28 and transmitted through the analyzer 25 to be the output light 24 may constantly be black. Therefore, an image having a high contrast ratio can be obtained.

With reference to FIGS. 8A through 8D, a method for producing the SLM 4 shown in FIG. 7 will be described.

First, an aluminum thin film (thickness: 100 nm) and a chrome film (thickness: 50 nm) are sequentially formed by vacuum evaporation on an entire surface of the transparent insulating substrate 11. As the transparent insulating substrate 11, a glass board having a size of 55 mm × 45 mm × 1.1 mm is used. The aluminum thin film blocks the writing light, and the chrome film improves the adhesion between the transparent insulating substrate 11 and the photoconductive layer 13 to be formed thereon of amorphous silicon. The aluminum thin film and the chrome film are patterned by lift-off using a positive resist.

Figure 8A:
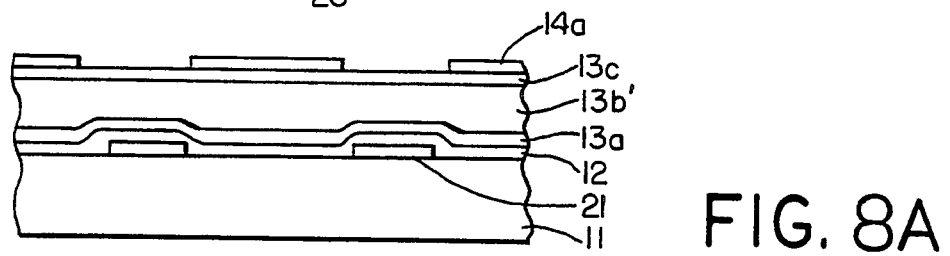

Then, as is shown in FIG. 8A, a plurality of apertures are formed in the aluminum thin film and the chrome film by photolithography to obtain the light blocking film 21. The apertures each have a size of 40 $\mu$m × 40 $\mu$m and are two-dimensionally arranged at a pitch of 45 $\mu$m. The apertures correspond to the pixels, respectively. Next, an ITO film (thickness: 100 nm) is formed on the transparent insulating substrate 11 so as to cover the light blocking film 21, thereby forming the transparent conductive electrode 12.

The p-type hydrogenated amorphous silicon layer 13a (thickness: 100 nm), the i-film 13b' (thickness: 1.8 $\mu$m) formed of an i-type hydrogenated amorphous silicon with no impurities, and the n-film 13c' (thickness: 300 nm) formed of an n-type hydrogenated amorphous silicon are sequentially formed on the transparent conductive electrode 12 by plasma CVD. Then, a metal thin film (formed of, for example, aluminum or chrome) having a thickness of 50 nm is formed on the n-film 13c' by vacuum evaporation. After a resist pattern is formed on the metal thin film, the metal thin film is etched using the resist pattern as a mask to form first reflecting films 14a only on the pixel portions of the photoconductive layer 13. The pixels each have a size of 20 μm×20 μm, and are two-dimensionally arranged at a pitch of 25 μm in a total number of 1000 pcs.×1000 pcs.

Figure 8B:
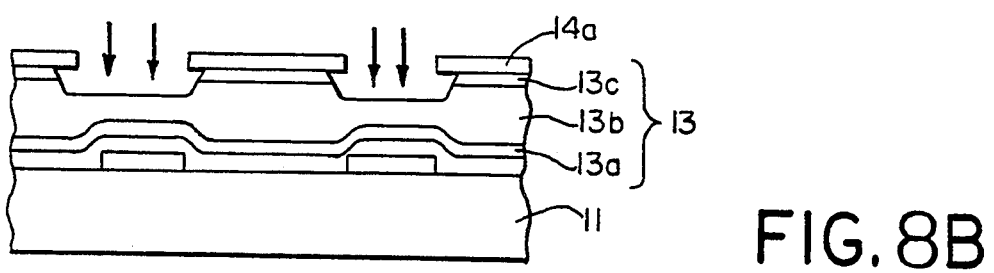

As is shown in FIG. 8B, the n-film 13c' and the i-film 13b' are etched using the first reflecting films 14a as masks, thereby completely removing the inter-pixel portion of the n-film 13c' and also removing an upper part of the inter-pixel portion of the i-film 13b'. Thus, the inter-pixel portion is etched to be a groove. Further, an n/i interface at the inter-pixel portion is eliminated.

The above-mentioned etching will be described in more detail. When the photoconductive layer 13 is subjected to dry etching by RIE using a mixture gas of $CF_4$ and oxygen, the photoconductive layer 13 is substantially vertically etched by 500 nm, namely, the whole thickness of the n-film 13c' (300 nm) and an upper part (200 nm) of the i-film 13b' in the interpixel portion. A following wet etching process performed for 10 seconds using a mixture solution of hydrogen fluoride and sulfuric acid (1:50) isotropically removes portions of the n-film 13c' below the first reflecting films 14a by 500 nm. Namely, the peripheries of the portions of the n-film 13c' which are below the first reflecting films 14a are removed to form the n-layers 13c. The groove formed in the photoconductive layer 13 has a depth of 1 μm. The first reflecting films 14a each have a size of 20 μm×20 μm, and the n-layers 13c below the first reflecting films 14a each have a size of 19 μm×19 μm.

Figure 8C:
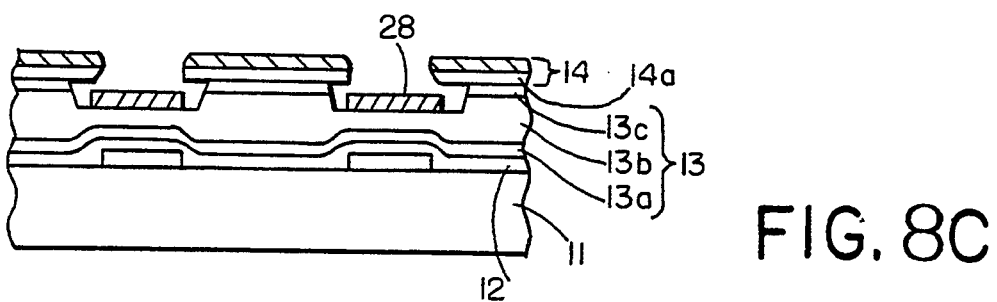

Next, as is shown in FIG. 8C, second reflecting films (thickness: 100 nm) formed of aluminum are formed by vacuum evaporation simultaneously on the bottom of the groove and on the first reflecting films 14a. The aluminum film having a thickness of 100 nm sufficiently blocks visible light and has a high reflectivity. The second reflecting film formed on the bottom of the groove (inter-pixel portion) acts as the output light blocking film 28. The first reflecting films 14a and the second reflecting films formed on the first reflecting films 14a constitute the reflecting films 14 together. The reflecting films 14 act as pixel electrodes.

The above-mentioned vacuum evaporation is performed so that the metal be splashed obliquely with respect to a main surface of the transparent insulating substrate 11, thus to be deposited below the reflecting films 14 which overhang. For example, the main surface of the transparent insulating substrate 11 is slanted at 20° with respect to the evaporation beam. As a result, an area of the output light blocking film 28 in the groove is expanded to partially overlap the reflecting films 14 as is shown in FIG. 9. Seen from the reading side (FIG. 9), an entire surface of the substrate is covered with an aluminum film. By adopting such a structure for blocking the reading light 22, the reading light 22 is prevented from being leaked to the photoconductive layer 13 between an end of the reflecting films 14 and an end of the output light blocking film 28. It is necessary, however, to prevent the output light blocking film 28 from contacting the n-layers 13c at the pixel portions during the vacuum evaporation in order to prevent crosstalk between the pixels.

Then, the alignment film 15 is formed to produce the SLM 4 shown in FIG. 7.

A further processing described hereinafter will provide an SLM having a more excellent light blocking. The process will be described with reference to FIG. 8D.

Before forming the alignment film 15, the reflecting films 14 and the output light blocking film 28 are used as masks for isotropically etching side walls of the groove in the photoconductive layer 13. Then, another metal film 29 is formed on the reflecting films 14 and the output light blocking film 28 so as to cover exposed portions of the i-layer 13b. On each of the pixel portions of the photoconductive layer 13, a pixel electrode including the reflecting film 14 and the metal film 29 is formed. On the inter-pixel portion, a light blocking film including the output light blocking film 28 and the metal film 29 is formed. Then, the alignment film 15 is formed.

The SLM 4 shown in FIG. 7 was evaluated for performance, using an incandescent light as the writing light 26 by applying an AC voltage to the SLM 4. It was confirmed that the ratio of the intensity of the output light 24 with respect to the intensity of the reading light 22 was as high as 80 to 90% without considering the loss caused by the polarizer 23 and the analyzer 25. The output light 24 having a sufficient was observed at the intensity of the writing light 26 of several microns $+W/cm^2$ or more. The SLM 4 showed satisfactory performance even with a low intensity of the writing light 26.

FIG. 10 shows the relationship between the intensity of the output light and the intensity of the input (writing) light at a constant level of voltage. In a relatively low range of the intensity of the input light, the curve showing the relationship is linear. This means that the SLM 4 can be used for a projection display apparatus for generating images with gray scale.

FIG. 11 shows the relationship between the driving voltage and the response time of the output light 24. When a positive voltage which is a forward bias for the photoconductive layer 13 formed of amorphous silicon and having a diode structure is applied, the FLC layer 16 is applied with a high voltage and the output light 24 reflected by the reflecting films 14 remains black even after the voltage application is stopped. Namely, the image data is stored for a long time, indicating that the SLM 4 can be used as a memory. When a negative voltage which is a reverse bias is applied, the voltage applied to the FLC layer 16 changes in accordance with the intensity of the writing light 26. After the voltage application is stopped, the FLC molecules are aligned so that the output light 24 generate an image having a gray scale. The degree of the gray scale depends on the level of the voltage. Such a response characteristic does not change even when the SLM 4 is sequentially driven. The contrast ratio of the image generated by the output light 24 is as satisfactory as 250:1, indicating little light leak and excellent light blocking. The reading light 22 had an illuminants of 100,000 1x (lux). Considering that the photoconductive layer 13 is switched by light of approximately 1 1x, the blocking of the SLM 4 is extremely excellent.

The SLM 4 was evaluated for performance by incorporation into the projection display apparatus as shown in FIG. 5. An image magnified to have a size corresponding to 100 in. had an illuminance corresponding to a light flux of 2000 lm or more on the screen 45. The image had a contrast ratio of 250:1, and a resolution of 650 lateral TV lines, namely, a resolution of 50 1p/mm for the SLM 4. In the case when a moving image was projected, no after image was generated with respect to the video rate, and a clear image having a high luminance was obtained. In order to obtain a color image, three sets of the CRT display 43 and the SLM 4 were prepared for the RGB colors. A color image was obtained by synthesizing three images corresponding to the RGB colors on the screen 45. A satisfactory color image was regenerated with high precision, and the amount of leaked light was as small as $1/10^4$ or less of a maximum illuminance of the light incident on the pixel portions.

Figure 12A:
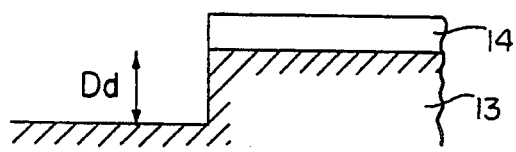
FIG. 12A is a cross sectional view of an etched portion after dry etching.
Figure 12B:
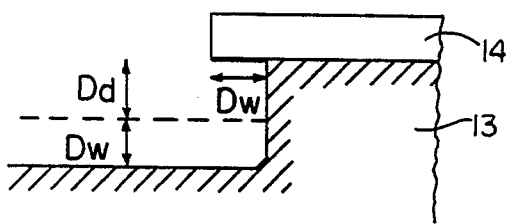
FIG. 12B is a cross sectional view of an etched portion after wet etching.

Before the formation of the output light blocking film 28, the relationship between the conditions for etching the photoconductive layer 13 and the light blocking degree was checked. The depth of vertical etching by dry etching (Dd) and the depth of the isotropical etching by wet etching (Dw) were changed as is shown in Table 1. FIG. 12A schematically shows a cross section of an etched portion after dry etching; and FIG. 12B schematically shows a cross section of an etched portion after wet etching. The dry etching was performed at a rate of approximately 400 nm/min.; and the wet etching was performed at a rate of approximately 5 nm/min. The output light blocking film 28 was formed under the same evaporating condition as shown in FIG. 8.

The light blocking degree of the SLM is evaluated as a function of the maximum amount of the reading light incident on the photoconductive layer 13 before the photoconductive layer 13 is switched. The above-mentioned maximum amount of each SLM is shown in Table 1.

TABLE 1

| Dd (nm) | Dw (nm) | Maximum amount of reading light incident on the photoconductive layer 13 |
| --- | --- | --- |
| 760 | 500 | 8000 |
|  | 1000 | 15000 |
| 1200 | 500 | 7000 |
|  | 1000 | 11000 |
| 1600 | 500 | 3000 |
|  | 1000 | 6000 |

Figure 13A:
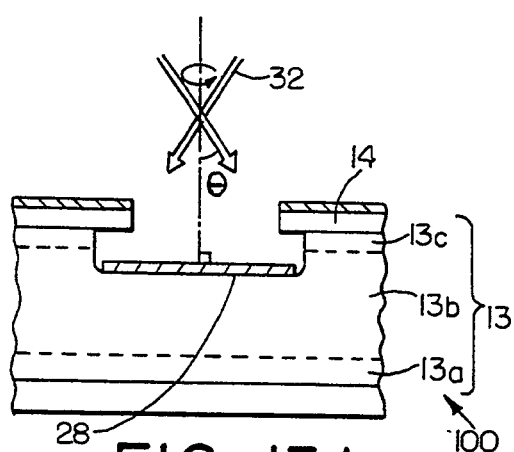
FIG. 13A is a view illustrating the case when a beam angle is relatively small in forming an output light blocking film.
Figure 13B:
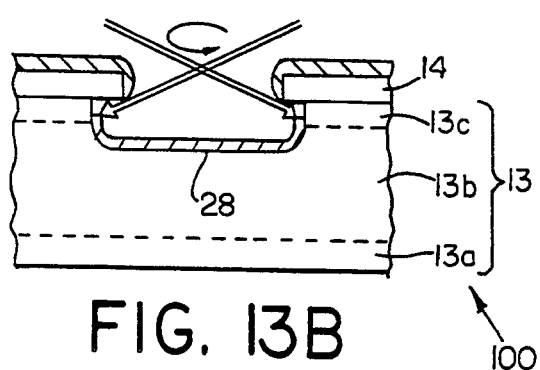
FIG. 13B is a view illustrating the case when a beam angle is relatively large in forming an output light blocking film.

The degree by which the output light blocking film 28 is put in below the reflecting films 14 can be controlled by an angle ($\theta$) by which the first panel 100 is supported in the evaporation apparatus. As is shown in FIG. 13A, the first panel 100 is supported so that an axis perpendicular to the main surface of the first panel 100 and a beam axis make an angle $\theta$, and the first panel 100 is allowed to make a precession. The output light blocking film 28 is formed using the reflecting films 14 as masks in this state. Thus, the metal atoms can isotropically be put in below the reflecting films 14 by the angle of $\theta$. As the angle $\theta$ is increased, the amount of the metal atoms which are put in below the reflecting films 14 is increased accordingly. Therefore, it is disadvantageously possible that the n-layers 13c are electrically connected to the output light blocking film 28 as is shown in FIG. 13B. Table 2 shows the relationship between the angle $\theta$ and the current level (Ir) when a voltage of 2 V is applied between the reflecting films 14 and the output light blocking film 28.

TABLE 2

| $\theta$ | Ir (A) |
| --- | --- |
| 0 | $0.25 \times 10^{-11}$ |
| 20 | $0.30 \times 10^{-11}$ |
| 50 | $0.20 \times 10^{-6}$ |

It is apparent from Table 2 that the level of crosstalk between the pixels is remarkably high at $\theta=50°$. The output light blocking film 28 is formed most preferably at $\theta=20°$.

EXAMPLE 7

Figure 14:
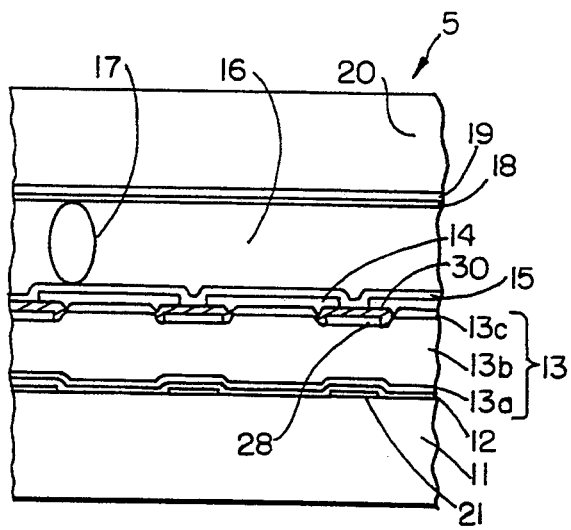
FIG. 14 is a cross sectional view schematically illustrating still another spatial light modulator according to the present invention.

FIG. 14 shows a cross section of an SLM 5 according to a seventh example of the present invention. In FIG. 14, elements corresponding to those in FIG. 1 bear identical reference numerals, respectively. In addition to the construction of the SLM 1, the SLM 5 includes an insulating layer 30 between the reflecting films 14 and the output light blocking film 28 for electrically isolating the reflecting films 14 and the output light blocking film 28 from each other.

As the degree by which the output light blocking film 28 is put in below the reflecting films 14 is increased, the light blocking degree is enhanced. The amount of the light which is leaked to the photoconductive layer 13 through the insulating layer 30 depends on the thickness of the insulating layer 30. As far as the insulation of the insulating layer 30 is secured, it is preferable that the insulating layer 30 is as thin as possible for effectively blocking the light.

The groove formed in the photoconductive layer 13 is filled with the output light blocking film 28 and the insulating layer 30. Such a structure is distinct from conventional structures described in, for example, U.S. Pat. No. 4,913,531, Japanese Laid-Open Patent Publication No. 3-192332, and J. Appl. Phys. Vol. 15 (1985), p. 1356 in the following point. In the above conventional SLMs, although a groove is formed in a light receiving layer in order to reduce the level of crosstalk between adjacent pixels, the groove is filled with a liquid crystal layer. In contrast, in the SLM 5, the reflecting films 14 corresponding to the pixel portions and the output light blocking film 28 corresponding to the inter-pixel portion are electrically isolated from each other by the insulating layer 30.

A method for producing the SLM 5 shown in FIG. 14 will be described.

First, the light blocking film 21 is formed on the transparent insulating substrate 11 (formed of glass) having a size of 55 mm×45 mm×1.1 mm in the same manner as described for the SLM 4 shown in FIG. 7. In other words, an aluminum thin film (thickness: 100 nm) and a chrome film (thickness: 50 nm) are sequentially formed by vacuum evaporation, and a plurality of apertures are formed in the aluminum thin film and the chrome film to obtain the light blocking film 21. The apertures are formed at positions corresponding to the pixels. An ITO film (thickness: 0.1 μm) is formed on the transparent insulating substrate 11 by sputtering so as to cover the light blocking film 21, to form the transparent conductive electrode 12.

Next, the p-layer 13a (thickness: 100 nm), the i-layer 13b (thickness: 1.8 μm), and the n-layer 13c (thickness: 300 nm) are sequentially formed on the transparent conductive electrode 12 by plasma CVD to form the photoconductive layer 13 having a diode structure. An aluminum thin film (thickness: 100 nm) is formed on the photoconductive layer 13 by vacuum evaporation, and then patterned by photolithography to obtain the output light blocking film 28.

An $SiN_x$ film (thickness: 100 nm) is formed on the resultant substrate by plasma CVD, and then patterned to obtain the insulating layer 30 which covers the output light blocking film 28. An aluminum film (thickness: 100 nm) is formed on the resultant substrate and then patterned by photolithography to obtain reflecting films 14, each having a size of 20 μm×20 μm and being two-dimensionally arranged at a pitch of 25 μm in a total number of 1000 pcs.×1000 pcs. Then, the same processes as described for the SLM 4 are performed to produce the SLM 5 shown in FIG. 14.

In the SLM 5, output light generating an image having a contrast ratio of 250:1 was obtained when the illuminance of the reading light 22 was 1,000,000 lx (lux). Considering that the photoconductive layer 13 is generally switched at an illuminance of 1 lx, an extremely high blocking degree was achieved.

The SLM 5 shown in FIG. 14 was evaluated for performance by incorporation into the projection display apparatus as shown in FIG. 5. An image magnified to have a size corresponding to 100 in. had an illuminance corresponding to a light flux of 2000 lm or more. The image had a contrast ratio of 250:1 and a resolution of 650 lateral TV lines. In the case when a moving image was projected, no after image was generated with respect to the video rate, and a clear image having a high luminance was obtained. A satisfactory color image was regenerated with high precision, and the amount of leaked light was as small as $1/10^4$ or less of a maximum illuminance of the light incident on the pixel portions.

EXAMPLE 8

Figure 15:
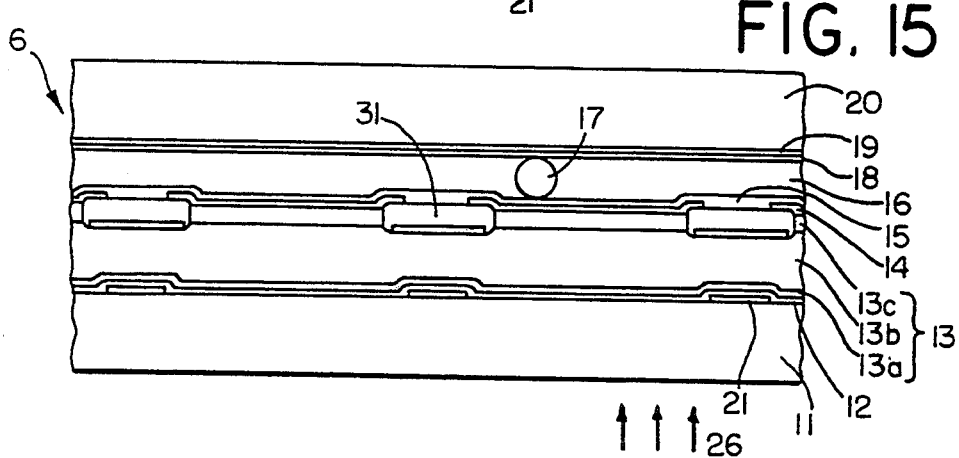
FIG. 15 is a cross sectional view schematically illustrating still another spatial light modulator according to the present invention.

FIG. 15 shows an SLM 6 according to an eighth example of the present invention. In FIG. 15, elements corresponding to those in FIG. 1 bear identical reference numerals, respectively. The SLM 6 is mainly distinct from the aforementioned SLMs according to the present invention in that the reflecting films 14 and the output light blocking film 28 are electrically isolated from each other by an organic polymer layer 31 interposed therebetween. As the degree by which the output light blocking film 28 is put in below the reflecting films 14 is increased, the light blocking degree is enhanced.

The amount of the light which is leaked to the photoconductive layer 13 through the organic polymer layer 31 depends on the thickness and the absorption coefficient of the organic polymer layer 31. By adding carbon or an organic coloring material which absorbs light in a certain wavelength range to the organic polymer layer 31, the amount of the reading light 22 leaked to the photoconductive layer 13 can be reduced. The intensity of the reading light 22 reflected by the output light blocking film 28 can be lowered by the organic polymer layer 31 corresponding to the inter-pixel portion. Therefore, the level of crosstalk between the pixels can be reduced.

Further, according to the present invention, since a black matrix is generated between the pixels by the existence of the organic polymer layer 31, the clarity of the image is improved. A black matrix which reliably generates a black image can be generated by preparing three SLMs for the RGB colors and selecting an organic polymer layer 31, containing a material, which has a suitable transmittance spectrum characteristic suitable for the light illuminating each SLM.

With reference to FIGS. 16A through 16F and FIGS. 17A through 17D, a method for producing the SLM 6 shown in FIG. 15 will be described.

Figure 16A:
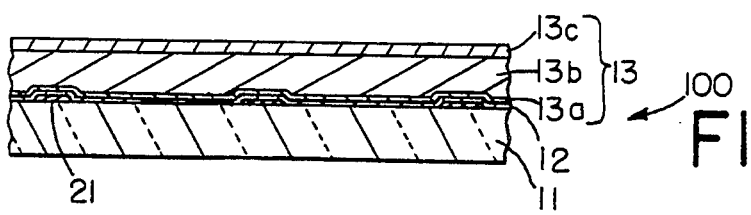
FIGS. 16A through 16F and FIGS. 17A through 17D are views illustrating a method for producing the spatial light modulator shown in FIG. 15.

First, as is shown in FIG. 16A, a metal layer (thickness: 100 nm) is formed on the transparent insulating substrate 11 formed of glass by resistance heating or electron beam evaporation. The metal layer may be a single aluminum layer, a single nichrome layer, or a multi-layer including a nichrome layer and an aluminum layer formed thereon. After a resist pattern regulating a pixel pattern (pixels each having a size of 20 μm×20 μm in a total number of 1000 pcs.×1000 pcs.) is formed on the metal layer, the metal layer is patterned by wet etching to obtain the light blocking film 21. Then, the resist pattern is removed. An transparent electrode material (thickness: 0.05 μm to 0.5 μm) are deposited on the transparent insulating substrate 11 by sputtering so as to cover the light blocking film 21, to form the transparent conductive electrode 12. Next, the p-layer 13a (thickness: 100 nm), the i-layer 13b (thickness: 1.7 μm), and the n-layer 13c (thickness: 200 nm) are sequentially formed on the transparent conductive electrode 12 by plasma CVD. The p-, i-, and n-layers 13a, 13b, and 13c are formed of hydrogenated amorphous silicon. Thus, the photoconductive layer 13 having a diode structure is formed.

Figure 16B:
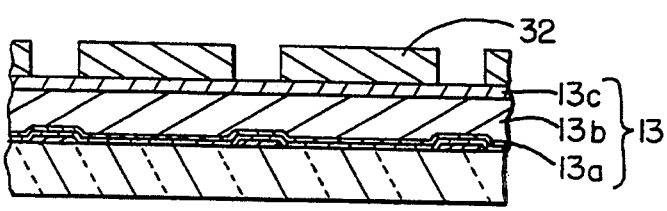

Next, a reflecting film of aluminum or the like is formed in a thickness of 50 to 100 nm on the photoconductive layer 13 by electron beam evaporation or the like. As is shown in FIG. 16B, a resist pattern 32 regulating a pixel pattern (pixels having a size of 20 μm×20 μm and two-dimensionally arranged at a pitch of 25 μm in a total number of 1000 pcs.×1000 pcs.) is formed on the photoconductive layer 13 by photolithography.

Figure 16C:
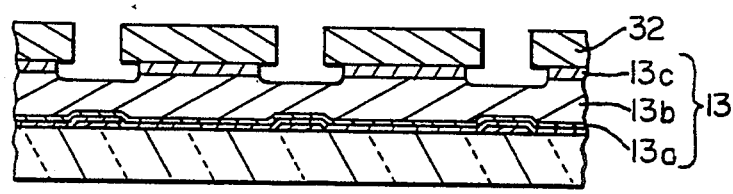
Figure 16D:
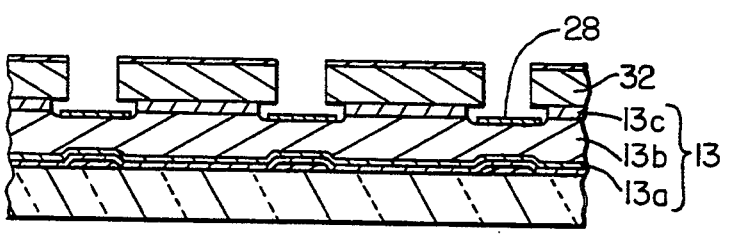
Figure 16E:
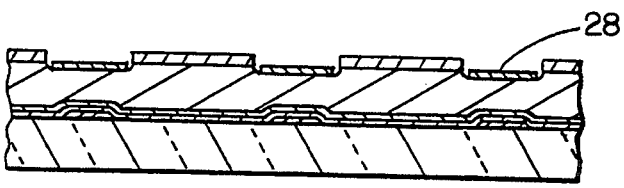

As is shown in FIG. 16C, an exposed area of the photoconductive layer 13 is etched by 500 nm with a solution of hydrogen fluoride and nitric acid ($HF:HNO_3=1:50$), and then aluminum (thickness: 100 nm) is deposited on the resultant substrate to form the output light blocking film 28 as is shown in FIG. 16D. Then, as is shown in FIG. 16E, the resist pattern 32 is removed by fuming nitric acid.

Figure 16F:
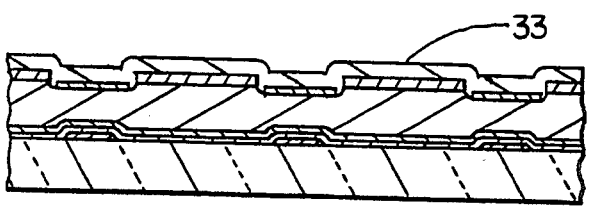
Figure 17A:
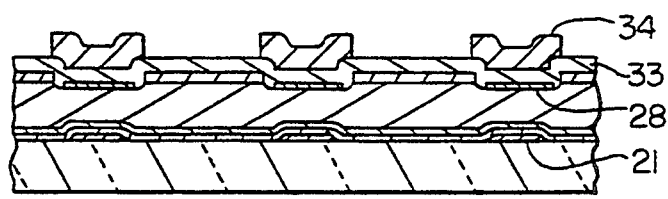
Figure 17B:
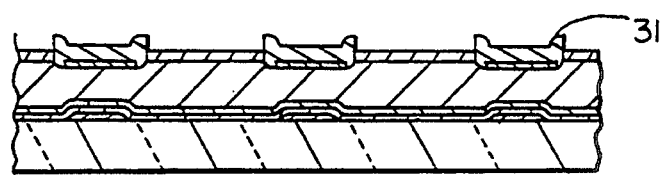
Figure 17C:
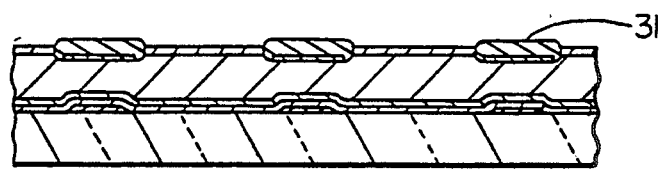

As is shown in FIG. 16F, a black polymer layer 33 having a high viscosity with carbon included in approximately 50% is formed on the resultant substrate by spin-coating to a thickness of 0.5 μm, and then is heated at 200° C. for 30 minutes. As is shown in FIG. 17A, a resist pattern 34 (thickness: 1.0 μm) regulating a pixel pattern (pixels each having a size of 20 μm×20 μm in a total number of 1000 pcs.×1000 pcs.) is formed on the black polymer layer 33. An exposed area of the black polymer layer 33 is etched by an oxygen plasma asher as is shown in FIG. 17B, and then the resist pattern 34 is removed again by the oxygen plasma asher as is shown in FIG. 17C. Thus, the organic polymer layer 31 is formed. The oxygen plasma ashing is performed at a substrate temperature of 100° to 120° C. for 30 minutes at a high frequency power of 40 W, after reducing the inner pressure of the chamber down to 0.1 Torr and then introducing oxygen to the chamber until the inner pressure is raised to 1 Torr.

Figure 17D:
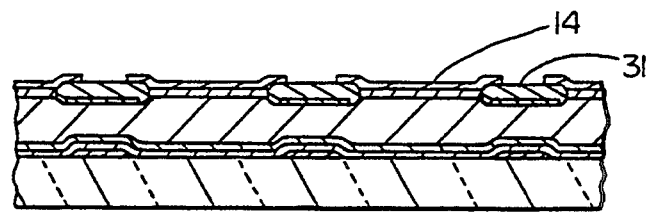

As is shown in FIG. 17D, an aluminum film (thickness: approximately 100 nm) is formed on the resultant substrate, and then a resist pattern (thickness: 1.0 μm) regulating a pixel pattern (pixels each having a size of 20 μm×20 μm; two-dimensionally arranged at a pitch of 25 μm in a total number of 1000 pcs.×1000 pcs.) is formed on the aluminum film by photolithography. After an exposed portion of the aluminum film is removed by a mixture etchant, the resist pattern is removed by fuming nitric acid to obtain the reflecting films 14. The resist pattern is made so that the reflecting films 14 each overlap the organic polymer layer 31. Thus, the SLM 6 shown in FIG. 15 is produced.

EXAMPLE 9

Figure 18:
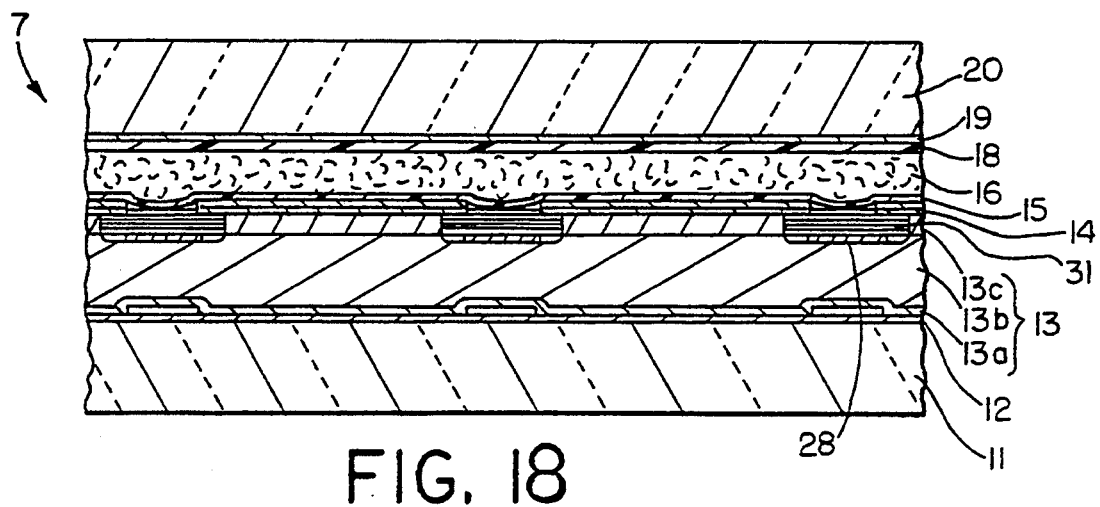
FIG. 18 is a cross sectional view schematically illustrating still another spatial light modulator according to the present invention.

FIG. 18 shows an SLM 7 according to a ninth example of the present invention. In FIG. 18, elements corresponding to those in FIG. 1 bear identical reference numerals, respectively. The SLM 7 is similar to but distinct from the SLM 6 shown in FIG. 15 in the production method. A method for producing the SLM 7 shown in FIG. 18 will be described with reference to FIGS. 19A through 19E.

Figure 19A:
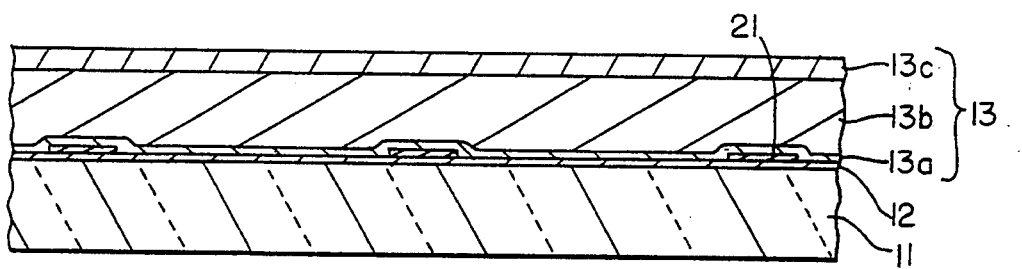
FIGS. 19A through 19E are views illustrating a method for producing the spatial light modulator shown in FIG. 18.
Figure 19B:
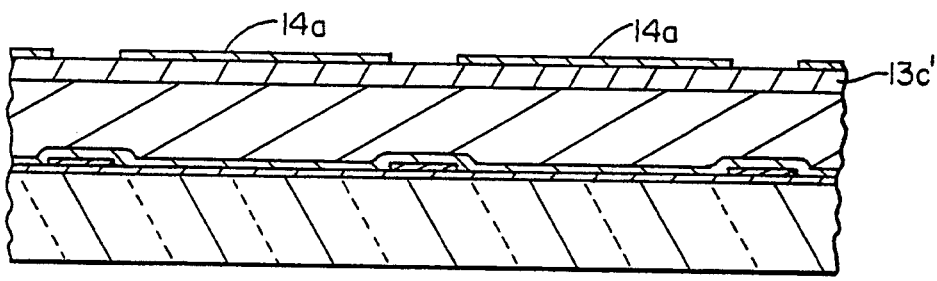
Figure 19C:
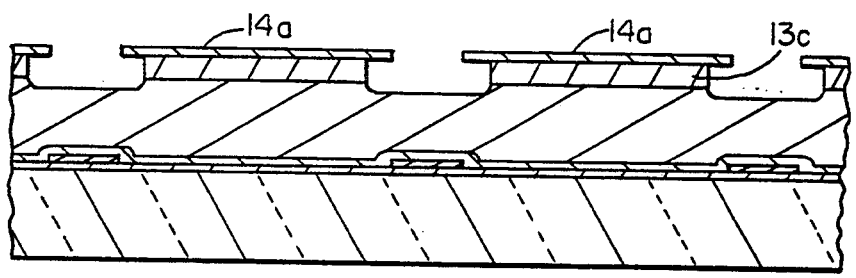
Figure 19D:
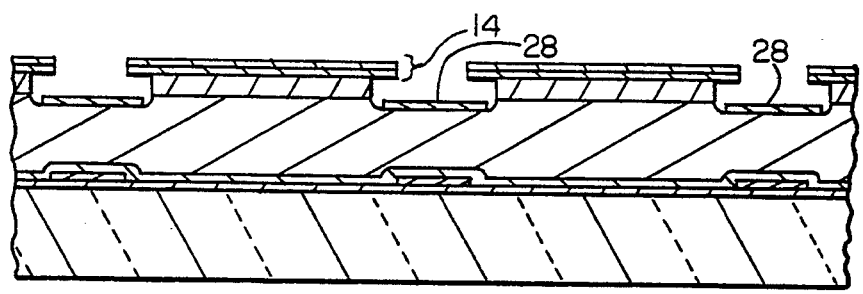
Figure 19E:
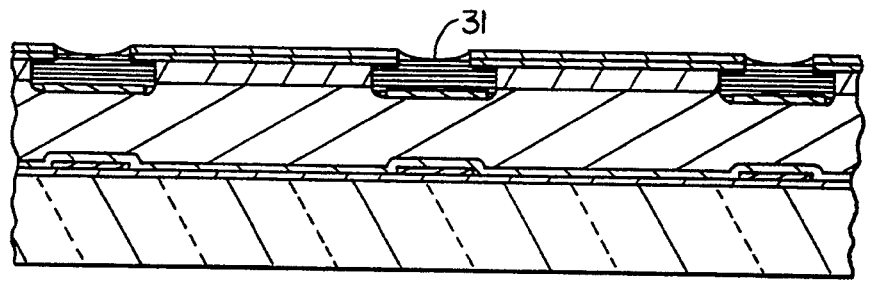

First, the first panel 100 shown in FIG. 19A is formed. The process for forming the first panel 100 of FIG. 19A is identical with that to form the first panel 100 of FIG. 16A. Then, after the reflecting films 14a are formed as is shown in FIG. 19B, an exposed portion of the photoconductive layer 13 is etched using the reflecting films 14a as masks as is shown in FIG. 19C. An aluminum film is formed on the resultant substrate to form the output light blocking film 28 on the inter-pixel portion and the reflecting films 14 on the pixel portions, as is shown in FIG. 19D. An insulating polymer film is formed on the resultant substrate, and then RIE is performed using oxygen. As a result, the organic polymer layer 31 is formed only on the inter-pixel portion as is shown in FIG. 19E. According to the production method illustrated in FIGS. 16A through 16F and FIG. 17A through 17D, it was required to perform etching using a mask three times in order to form the light blocking structure including the reflecting films 14 and the output light blocking film 28. In contrast, according to the production method shown in FIGS. 19A through 19E, such an etchant process is performed only once.

The SLM 7 was evaluated for performance by incorporation into the projection display apparatus as shown in FIG. 5. An image magnified to have a size corresponding to 100 in. had an illuminance corresponding to a light flux of 2500 lm or more. A contrast ratio of 250:1 was achieved The maximum possible illuminance of the light incident on the SLM 7 was 1,000,000 lx or more.

Figure 20A:
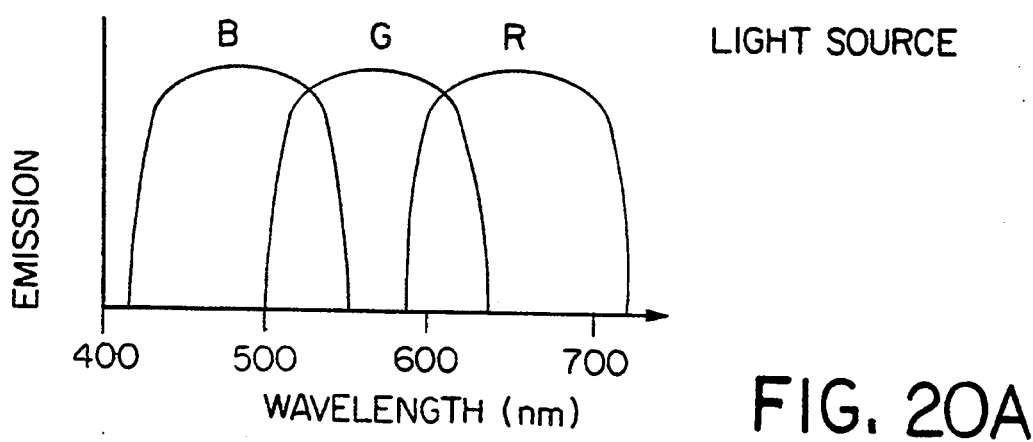
FIG. 20A is a graph illustrating an emission spectrum of an organic polymer containing a coloring matter.
Figure 20B:
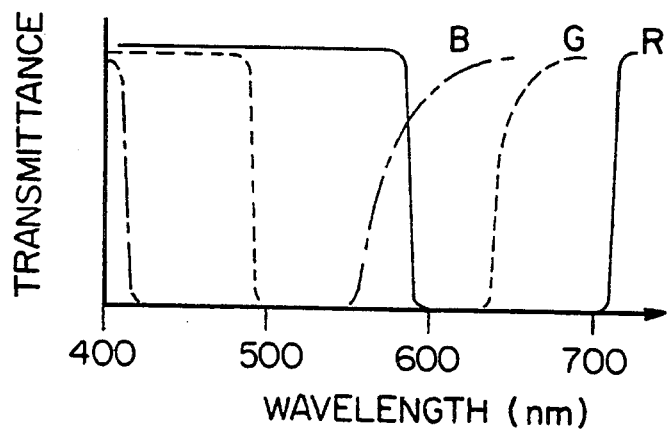
FIG. 20B is a graph illustrating a transmittance characteristic of an organic polymer containing a coloring matter.
Figure 21:
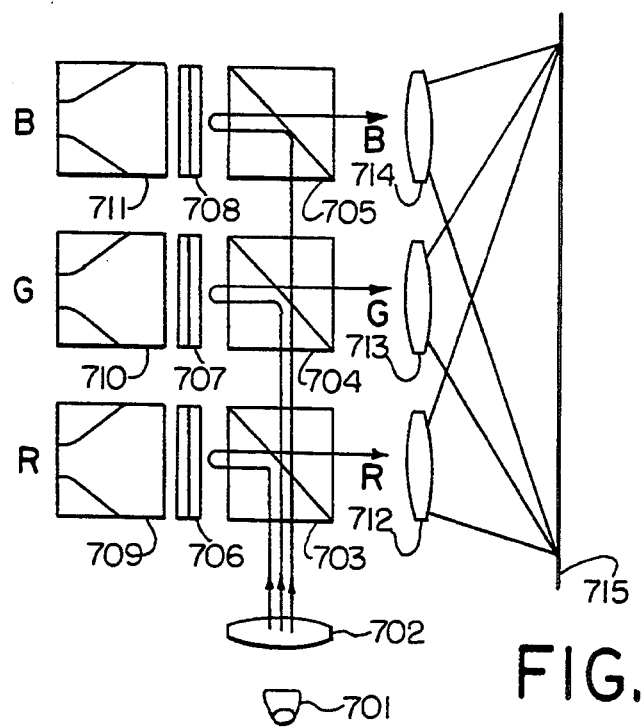
FIG. 21 is a schematic view illustrating a projection display apparatus including three spatial light modulators (for the RGB colors) using the organic polymer added with the coloring matter having the characteristics shown in FIG. 20.

FIGS. 20A and 20B show optical characteristics of an organic polymer containing a coloring matter. FIG. 21 schematically shows a projection display apparatus including three SLMs (for the RGB colors) using the organic polymer added with the coloring matter having the characteristics shown in FIGS. 20A and 20B.

In FIG. 21, the reading light emitted from a metal halide lamp 701 is transmitted through a lens 702 and then divided into three light fluxes having the RGB colors by three polarizing beam splitters 703, 704, and 705. The SLMs 706, 707, and 708 are provided with image data concerning the three colors by writing CRTs 709, 710, and 711. The light fluxes reflected by the SLMs 706, 707, and 708 are adjusted by convex lenses 712, 713, and 714 so that pixels of the three colors form a proper image on a screen 715. On the screen 715, the pixels and the black color between the pixels had a satisfactory contrast of 300:1 or higher, thereby confirming the generation of a black matrix.

Table 3 shows the relationship between the thickness of the organic polymer layer 31 and the contrast ratio concerning the SLM 7 shown in FIG. 18. The contrast ratio was found as a function of the ratio of the luminance of the pixel portions with respect to the luminance of the light-blocked interpixel portion of the SLM 7.

TABLE 3

| Film thickness | Contrast ratio |
| --- | --- |
| 0.3 μm | 100:1 |
| 0.5 μm | 150:1 |
| 1 μm | 250:1 |
| 2 μm | 300:1 |

As has been described so far, according to the present invention, a spatial light modulator can be provided which is optimum for use in a projection display apparatus for generating an image having a high resolution and a high luminance in a large image plane. A holography television apparatus using a spatial light display according to the present invention can display a clear three-dimensional image in real time.

Further, according to the present invention, a spatial light modulator providing a high resolution and a satisfactory contrast ratio which are necessary for a high quality image is obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A spatial light modulator, comprising:
   a first electrode;
   a second electrode opposed to the first electrode;
   a photoconductive layer electrically connected to the first electrode and including a plurality of pixel portions and an inter-pixel portion between the pixel portions, the pixel portions being electrically isolated from one another by the inter-pixel portions and an upper surface of the inter-pixel portion being at a level lower than a level of upper surfaces of the pixel portions;
   a plurality of reflecting films electrically connected to the pixel portions of the photoconductive layer respectively, the reflecting films being electrically isolated from one another; and
   a liquid crystal layer interposed between the reflecting films and the second electrode,
   wherein the pixel portions each have a rectifying function between the reflecting film connected thereto and the first electrode, and the spatial light modulator further includes an input light blocking film for preventing writing light from being incident on the inter-pixel portion of the photoconductive layer.

2. A spatial light modulator according to claim 1, wherein the pixel portions of the photoconductive layer each have a diode structure, to be provided with the rectifying function.

3. A spatial light modulator according to claim 2, wherein the pixel portions of the photoconductive layer each include a p-type semiconductor layer, an i-type semiconductor layer provided on the p-type semiconductor layer, and an n-type semiconductor layer provided on the i-type semiconductor layer, to be provided with the rectifying function.

4. A spatial light modulator according to claim 3, wherein the inter-pixel portion includes an i-type semiconductor layer for substantially preventing electrical carriers generated in each pixel portion of the photoconductive layer from being diffused into the other pixel portions.

5. A spatial light modulator according to claim 4, further comprising an output light blocking film provided on the inter-pixel portion of the photoconductive layer, for preventing reading light from being incident on the inter-pixel portion.

6. A spatial light modulator according to claim 3, further comprising an outer light blocking film provided on the inter-pixel portion of the photoconductive layer, for preventing reading light from being incident on the inter-pixel portion.

7. A spatial light modulator according to claim 2, further comprising an output light blocking film provided on the inter-pixel portion of the photoconductive layer, for preventing reading light from being incident on the inter-pixel portion.

8. A spatial light modulator according to claim 1, further comprising an output light blocking film provided on the inter-pixel portion of the photoconductive layer, for preventing reading light from being incident on the inter-pixel portion.

9. A spatial light modulator according to claim 1, further comprising a first transparent insulating substrate and a second transparent insulating substrate, wherein the first transparent insulating substrate supports the first electrode and the second transparent insulating substrate supports the second electrode.

10. A spatial light modulator according to claim 1, wherein the first electrode and the second electrode are transparent conductive electrodes.

11. A spatial light modulator, comprising:
a first electrode;
a second electrode opposed to the first electrode;
a photoconductive layer electrically connected to the first electrode and including a plurality of pixel portions and an inter-pixel portion between the pixel portions, the pixel portions being electrically isolated from one another by the inter-pixel portion;
a plurality of reflecting films electrically connected to the pixel portions of the photoconductive layer respectively, the reflecting films being electrically isolated form one another; and
a liquid crystal layer interposed between the reflecting films and the second electrode,
wherein the pixel portions each have a diode structure and a rectifying function between the reflecting film connected thereto and the first electrode,
wherein the pixel portions of the photoconductive layer each include a p-type semiconductor layer, an i-type semiconductor layer provided on the p-type semiconductor layer, and an n-type semiconductor layer provided on the i-type semiconductor layer, to be provided with the rectifying function,
wherein the inter-pixel portion includes an i-type semiconductor layer for substantially preventing electrical carriers generated in each pixel portion of the photoconductive layer form being diffused into the other pixel portions, and
wherein an upper surface of the inter-pixel portion of the photoconductive layer is at a level lower than a level of upper surfaces of the pixel portions of the photoconductive layer, and the i-type semiconductor layer is exposed at the upper surface of the inter-pixel portion, and the spatial light modulator further includes an input light blocking film for preventing writing light from being incident on the inter-pixel portion of the photoconductive layer.

12. A spatial light modulator according to claim 11, further comprising an output light blocking film provided on the inter-pixel portion of the photoconductive layer, for preventing reading light from being incident on the inter-pixel portion.

13. A spatial light modulator according to claim 12, further comprising an insulating layer for covering the output light blocking film and for electrically isolating the output light blocking film from the reflecting films.

14. A spatial light modulator according to claim 13, wherein the insulting layer is formed of an organic polymer containing a material absorbing light having a wavelength in a specified range.

15. A spatial light modulator, comprising:
a first electrode;
a second electrode opposed to the first electrode;
a photoconductive layer electrically connected to the first electrode and including a plurality of pixel portions and an inter-pixel portion between the pixel portions, the pixel portions being electrically isolated from one another by the inter-pixel portion;
a plurality of reflecting films electrically connected to the pixel portions of the photoconductive layer respectively, the reflecting films being electrically isolated from one another; and
a liquid crystal layer interposed between the reflecting films and the second electrode,
wherein the pixel portions each have a rectifying function between the reflecting film connected thereto and the first electrode; and
further comprising an output light blocking film provided on the inter-pixel portion of the photoconductive layer for preventing reading light from being incident on the inter-pixel portion and an insulating layer for covering the output light blocking film and for electrically isolating the output light blocking film from the reflecting films.

16. A spatial light modulator according to claim 15, wherein the insulting layer is formed of an organic polymer containing a material absorbing light having a wavelength in a specified range.

17. A spatial light modulator comprising:
a first electrode;
a second electrode opposed to the first electrode;
a photoconductive layer electrically connected to the first electrode and including a plurality of pixel portions and an inter-pixel portion between the pixel portions, the pixel portions being electrically isolated from one another by the inter-pixel portion;
a plurality of reflecting films electrically connected to the pixel portions of the photoconductive layer respectively, the reflecting films being electrically isolated from one another; and
a liquid crystal layer interposed between the reflecting films and the second electrode,
wherein the pixel portions each have a diode structure and a rectifying function between the reflecting film connected thereto and the first electrode; and further comprising an output light blocking film provided on the inter-pixel portion of the photoconductive layer for preventing reading light from being incident on the inter-pixel portion and an insulating layer for covering the output light blocking film and for electrically isolating the output light blocking film from the reflecting films.

18. A spatial light modulator according to claim 17, wherein the insulting layer is formed of an organic polymer containing a material absorbing light having a wavelength in a specified range.

19. A spatial light modulator, comprising:
a first electrode;
a second electrode opposed to the first electrode;
a photoconductive layer electrically connected to the first electrode and including a plurality of pixel portions and an inter-pixel portion between the pixel portions, the pixel portions being electrically isolated from one another by the inter-pixel portion;
a plurality of reflecting films electrically connected to the pixel portions of the photoconductive layer respectively, the reflecting films being electrically isolated from one another; and
a liquid crystal layer interposed between the reflecting films and the second electrode,
wherein the pixel portions each have a diode structure and a rectifying function between the reflecting film connected thereto and the first electrode,
wherein the pixel portions of the photoconductive layer each include a p-type semiconductor layer, an i-type semiconductor layer provided on the p-type semiconductor layer, and an n-type semiconductor layer provided on the i-type semiconductor layer, to be provided with the rectifying function; and p1 further comprising an output light blocking film provided on the inter-pixel portion of the photoconductive layer for preventing reading light from being incident on the inter-pixel portion and an insulating layer for covering the output light blocking film and for electrically isolating the output light blocking film from the reflecting films.

20. A spatial light modulator according to claim 19, wherein the insulting layer is formed of an organic polymer containing a material absorbing light having a wavelength in a specified range.

21. A spatial light modulator, comprising:
a first electrode;
a second electrode opposed to the first electrode;
a photoconductive layer electrically connected to the first electrode and including a plurality of pixel portions and an inter-pixel portion between the pixel portions, the pixel portions being electrically isolated from one another by the inter-pixel portion;
a plurality of reflecting films electrically connected to the pixel portions of the photoconductive layer respectively, the reflecting films being electrically isolated from one another; and
a liquid crystal layer interposed between the reflecting films and the second electrode.
wherein the pixel portions each have a diode structure and a rectifying function between the reflecting film connected thereto and the first electrode,
wherein the pixel portions of the photoconductive layer each include a p-type semiconductor layer, an i-type semiconductor layer provided on the p-type semiconductor layer, and an n-type semiconductor layer provided on the i-type semiconductor layer, to be provided with the rectifying function, and
wherein the inter-pixel portion includes an i-type semiconductor layer for substantially preventing electrical carriers generated in each pixel portion of the photoconductive layer from being diffused into the other pixel portions; and
further comprising an output light blocking film provided on the inter-pixel portion of the photoconductive layer for preventing reading light from being incident on the inter-pixel portion and an insulating layer for covering the output light blocking film and for electrically isolating the output light blocking film from the reflecting films.

22. A spatial light modulator according to claim 21, wherein the insulting layer is formed of an organic polymer containing a material absorbing light having a wavelength in a specified range.

23. A method for producing a spatial light modulator, comprising the steps of:
laminating a plurality of layers to form a photoconductive layer having a diode structure; and
selectively etching a specified area of at least one of the plurality of layers to obtain a plurality of pixel portions with no part thereof being etched and an inter-pixel portion for substantially electrically isolating the pixel portions from one another, the inter-pixel portion being obtained between the pixel portions and an upper surface of the inter pixel portion being at a level lower than a level of upper surfaces of the pixel portions,
further comprising the step of forming an input light blocking film for preventing writing light from being incident on the inter-pixel portion of the photoconductive layer.

24. A method for producing a spatial light modulator according to claim 23, wherein a plurality of reflecting films are formed on the photoconductive layer, and the step of etching is performed using the reflecting films as masks.

25. A method for producing a spatial light modulator, comprising the steps of:
laminating a plurality of layers to form a photoconductive layer having a diode structure; and
selectively etching a specified area of at least one of the plurality of layers to obtain a plurality of pixel portions with no part thereof being etched and an inter-pixel portion for substantially electrically isolating the pixel portions from one another, the inter-pixel portion being obtained between the pixel portions,
wherein a plurality of reflecting films are formed on the photoconductive layer, and the step of etching is performed using the reflecting films as masks; and
further comprising the step of, after the step of etching, depositing a metal simultaneously on the reflecting films and on the inter-pixel portion to form an output light blocking film on the inter-pixel portion.

26. A method for producing a spatial light modulator according to claim 25, further comprising the step of, after the step of forming the output light blocking film, further etching side walls of the photoconductive layer using the output light blocking film as a mask.

27. A method for producing a spatial light modulator according to claim 25, further comprising the step of, after the step of forming the output light blocking films, forming an insulating layer for covering the output light blocking film.

* * * * *